(12) United States Patent
Gooneratne et al.

(10) Patent No.: US 11,414,985 B2
(45) Date of Patent: Aug. 16, 2022

(54) MEASURING WELLBORE CROSS-SECTIONS USING DOWNHOLE CALIPER TOOLS

(71) Applicant: Saudi Arabian Oil Company, Dhahran (SA)

(72) Inventors: Chinthaka Pasan Gooneratne, Dhahran (SA); Bandar S. Al-Malki, Dammam (SA); Bodong Li, Dhahran (SA); Guodong Zhan, Dhahran (SA); Timothy Eric Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 254 days.

(21) Appl. No.: 16/886,493

(22) Filed: May 28, 2020

(65) Prior Publication Data

US 2021/0372270 A1   Dec. 2, 2021

(51) Int. Cl.
*E21B 47/08* (2012.01)
*G01B 5/12* (2006.01)

(52) U.S. Cl.
CPC ............. *E21B 47/08* (2013.01); *G01B 5/12* (2013.01)

(58) Field of Classification Search
CPC .................................. E21B 47/08; G01B 5/12
USPC ......................... 33/544, 544.2, 544.3, 544.5
See application file for complete search history.

(56) References Cited

U.S. PATENT DOCUMENTS

| | | |
|---|---|---|
| 891,957 A | 6/1908 | Schubert |
| 2,286,673 A | 6/1942 | Douglas |
| 2,305,062 A | 12/1942 | Church et al. |
| 2,344,120 A | 3/1944 | Baker |
| 2,757,738 A | 9/1948 | Ritchey |

(Continued)

FOREIGN PATENT DOCUMENTS

| | | |
|---|---|---|
| CA | 2669721 | 7/2011 |
| CN | 2379603 | 5/2000 |

(Continued)

OTHER PUBLICATIONS

PCT International Search Report and Written Opinion in International Appln. No. PCT/US2021/033837, dated Sep. 17, 2021, 14 pages.

(Continued)

*Primary Examiner* — Christopher W Fulton

(74) *Attorney, Agent, or Firm* — Fish & Richardson P.C.

(57) ABSTRACT

Tools and methods are described to measure dimensions of wellbores. Downhole caliper tools include a downhole collar and an uphole collar having a running position and a sensing position. The uphole collar is farther from the downhole collar in the running position than in the sensing position. A caliper sensor assembly includes: a sensor module defining tracks extending parallel to an axis of the caliper tool, the sensor module positioned towards an uphole end of the caliper tool relative to the uphole collar; and a caliper disposed between the downhole collar and the uphole collar including: a flexible mesh extending from the downhole collar to the uphole collar. Movement of the uphole collar from the running position to the sensing position axially compresses and radially expands the flexible mesh. The annular sensor module can measure dimensions of the flexible mesh relative to the axis of the caliper tool.

18 Claims, 27 Drawing Sheets

(56) References Cited

U.S. PATENT DOCUMENTS

| | | |
|---|---|---|
| 2,509,608 A | 5/1950 | Penfield |
| 2,688,369 A | 9/1954 | Broyles |
| 2,719,363 A | 10/1955 | Richard et al. |
| 2,795,279 A | 6/1957 | Erich |
| 2,799,641 A | 7/1957 | Gordon |
| 2,805,045 A | 9/1957 | Goodwin |
| 2,841,226 A | 7/1958 | Conrad et al. |
| 2,927,775 A | 3/1960 | Hildebrandt |
| 3,016,244 A | 1/1962 | Friedrich et al. |
| 3,023,507 A | 3/1962 | Camp |
| 3,028,915 A | 4/1962 | Jennings |
| 3,087,552 A | 4/1963 | Graham |
| 3,102,599 A | 9/1963 | Hillbum |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,236,307 A | 2/1966 | Brown |
| 3,268,003 A | 8/1966 | Essary |
| 3,428,125 A | 2/1969 | Parker |
| 3,522,848 A | 8/1970 | New |
| 3,533,166 A * | 10/1970 | Pino, Jr. .......... G01B 5/00 33/544 |
| 3,547,192 A | 12/1970 | Claridge et al. |
| 3,547,193 A | 12/1970 | Gill |
| 3,642,066 A | 2/1972 | Gill |
| 3,656,564 A | 4/1972 | Brown |
| 3,685,158 A * | 8/1972 | Planche .......... G01V 11/005 33/544.3 |
| 3,696,866 A | 10/1972 | Dryden |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,064,211 A | 12/1977 | Wood |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jeambey |
| 4,193,451 A | 3/1980 | Dauphine |
| 4,196,329 A | 4/1980 | Rowland et al. |
| 4,199,025 A | 4/1980 | Carpenter |
| 4,228,593 A * | 10/1980 | Frank .......... G01B 7/13 33/544.3 |
| 4,251,921 A * | 2/1981 | Fink .......... G01B 7/281 33/544.3 |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,343,651 A | 8/1982 | Yazu et al. |
| 4,354,559 A | 10/1982 | Johnson |
| 4,373,581 A | 2/1983 | Toellner |
| 4,394,170 A | 7/1983 | Sawaoka et al. |
| 4,396,062 A | 8/1983 | Iskander |
| 4,412,585 A | 11/1983 | Bouck |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,557,327 A | 12/1985 | Kinley et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,660,636 A | 4/1987 | Rundell et al. |
| 4,705,108 A | 11/1987 | Little et al. |
| 4,807,484 A | 2/1989 | Goedecke |
| 4,817,711 A | 4/1989 | Jeambey |
| 5,037,704 A | 8/1991 | Nakai et al. |
| 5,055,180 A | 10/1991 | Klaila |
| 5,068,819 A | 11/1991 | Misra et al. |
| 5,082,054 A | 1/1992 | Kiamanesh |
| 5,092,056 A | 3/1992 | Deaton |
| 5,107,705 A | 4/1992 | Wraight et al. |
| 5,107,931 A | 4/1992 | Valka et al. |
| 5,228,518 A | 7/1993 | Wilson et al. |
| 5,236,039 A | 8/1993 | Edelstein et al. |
| 5,278,550 A | 1/1994 | Rhein-Knudsen et al. |
| 5,388,648 A | 2/1995 | Jordan, Jr. |
| 5,490,598 A | 2/1996 | Adams |
| 5,501,248 A | 3/1996 | Kiest, Jr. |
| 5,690,826 A | 11/1997 | Cravello |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,958,236 A | 9/1999 | Bakula |
| RE36,362 E | 11/1999 | Jackson |
| 6,012,526 A | 1/2000 | Jennings et al. |
| 6,041,860 A | 3/2000 | Nazzal et al. |
| 6,096,436 A | 8/2000 | Inspektor |
| 6,170,531 B1 | 1/2001 | Jung et al. |
| 6,173,795 B1 | 1/2001 | McGarian et al. |
| 6,189,611 B1 | 2/2001 | Kasevich |
| 6,254,844 B1 | 7/2001 | Takeuchi et al. |
| 6,268,726 B1 | 7/2001 | Prammer |
| 6,269,953 B1 | 8/2001 | Seyffert et al. |
| 6,290,068 B1 | 9/2001 | Adams et al. |
| 6,325,216 B1 | 12/2001 | Seyffert et al. |
| 6,328,111 B1 | 12/2001 | Bearden et al. |
| 6,354,371 B1 | 3/2002 | O'Blanc |
| 6,371,302 B1 | 4/2002 | Adams et al. |
| 6,413,399 B1 | 7/2002 | Kasevich |
| 6,443,228 B1 | 9/2002 | Aronstam |
| 6,454,099 B1 | 9/2002 | Adams et al. |
| 6,510,947 B1 | 1/2003 | Schulte et al. |
| 6,534,980 B2 | 2/2003 | Toufaily et al. |
| 6,544,411 B2 | 4/2003 | Varandaraj |
| 6,560,889 B1 * | 5/2003 | Lechen .......... E21B 47/08 33/558.2 |
| 6,561,269 B1 | 5/2003 | Brown et al. |
| 6,571,877 B1 | 6/2003 | Van Bilderbeek |
| 6,607,080 B2 | 8/2003 | Winkler et al. |
| 6,612,384 B1 | 9/2003 | Singh et al. |
| 6,623,850 B2 | 9/2003 | Kukino et al. |
| 6,629,610 B1 | 10/2003 | Adams et al. |
| 6,637,092 B1 | 10/2003 | Menzel |
| 6,678,616 B1 | 1/2004 | Winkler et al. |
| 6,722,504 B2 | 4/2004 | Schulte et al. |
| 6,761,230 B2 | 7/2004 | Cross et al. |
| 6,814,141 B2 | 11/2004 | Huh et al. |
| 6,845,818 B2 | 1/2005 | Tutuncu et al. |
| 6,850,068 B2 | 2/2005 | Chernali et al. |
| 6,895,678 B2 | 5/2005 | Ash et al. |
| 6,912,177 B2 | 6/2005 | Smith |

(56) References Cited

U.S. PATENT DOCUMENTS

| | | | |
|---|---|---|---|
| 6,971,265 | B1 | 12/2005 | Sheppard et al. |
| 6,993,432 | B2 | 1/2006 | Jenkins et al. |
| 7,000,777 | B2 | 2/2006 | Adams et al. |
| 7,013,992 | B2 | 3/2006 | Tessari et al. |
| 7,048,051 | B2 | 5/2006 | McQueen |
| 7,091,460 | B2 | 8/2006 | Kinzer |
| 7,109,457 | B2 | 9/2006 | Kinzer |
| 7,115,847 | B2 | 10/2006 | Kinzer |
| 7,216,767 | B2 | 5/2007 | Schulte et al. |
| 7,312,428 | B2 | 12/2007 | Kinzer |
| 7,322,776 | B2 | 1/2008 | Webb et al. |
| 7,331,385 | B2 | 2/2008 | Symington |
| 7,376,514 | B2 | 5/2008 | Habashy et al. |
| 7,387,174 | B2 | 6/2008 | Lurie |
| 7,445,041 | B2 | 11/2008 | O'Brien |
| 7,455,117 | B1 | 11/2008 | Hall et al. |
| 7,461,693 | B2 | 12/2008 | Considine et al. |
| 7,484,561 | B2 | 2/2009 | Bridges |
| 7,562,708 | B2 | 7/2009 | Cogliandro et al. |
| 7,629,497 | B2 | 12/2009 | Pringle |
| 7,631,691 | B2 | 12/2009 | Symington et al. |
| 7,650,269 | B2 | 1/2010 | Rodney |
| 7,677,673 | B2 | 3/2010 | Tranquilla et al. |
| 7,730,625 | B2 | 6/2010 | Blake |
| 7,951,482 | B2 | 5/2011 | Ichinose et al. |
| 7,980,392 | B2 | 7/2011 | Varco |
| 8,237,444 | B2 | 8/2012 | Simon |
| 8,245,792 | B2 | 8/2012 | Trinh et al. |
| 8,275,549 | B2 | 9/2012 | Sabag et al. |
| 8,484,858 | B2 | 7/2013 | Brannigan et al. |
| 8,511,404 | B2 | 8/2013 | Rasheed |
| 8,526,171 | B2 | 9/2013 | Wu et al. |
| 8,528,668 | B2 | 9/2013 | Rasheed |
| 8,567,491 | B2 | 10/2013 | Lurie |
| 8,794,062 | B2 | 8/2014 | DiFoggio et al. |
| 8,884,624 | B2 | 11/2014 | Homan et al. |
| 8,925,213 | B2 | 1/2015 | Sallwasser |
| 8,960,215 | B2 | 2/2015 | Cui et al. |
| 9,217,323 | B2 | 12/2015 | Clark |
| 9,222,350 | B2 | 12/2015 | Vaughn et al. |
| 9,250,339 | B2 | 2/2016 | Ramirez |
| 9,394,782 | B2 | 7/2016 | DiGiovanni et al. |
| 9,435,159 | B2 | 9/2016 | Scott |
| 9,464,487 | B1 | 10/2016 | Zum |
| 9,470,059 | B2 | 10/2016 | Zhou |
| 9,494,032 | B2 | 11/2016 | Roberson et al. |
| 9,528,366 | B2 | 12/2016 | Selman et al. |
| 9,562,987 | B2 | 2/2017 | Guner et al. |
| 9,664,011 | B2 | 5/2017 | Kruspe et al. |
| 9,702,211 | B2 | 7/2017 | Tinnen |
| 9,731,471 | B2 | 8/2017 | Schaedler et al. |
| 9,739,141 | B2 | 8/2017 | Zeng et al. |
| 10,000,983 | B2 | 6/2018 | Jackson et al. |
| 10,174,577 | B2 | 1/2019 | Leuchtenberg et al. |
| 10,233,372 | B2 | 3/2019 | Ramasamy et al. |
| 10,394,193 | B2 | 8/2019 | Li et al. |
| 10,865,606 | B2 * | 12/2020 | Massey .............. E21B 17/1021 |
| 10,988,991 | B1 * | 4/2021 | McCormick ........ E21B 17/1021 |
| 11,136,880 | B1 * | 10/2021 | McCormick ............ E21B 47/01 |
| 2003/0159776 | A1 | 8/2003 | Graham |
| 2003/0230526 | A1 | 12/2003 | Okabayshi et al. |
| 2004/0182574 | A1 | 9/2004 | Sarmad et al. |
| 2004/0255479 | A1 | 12/2004 | Moake et al. |
| 2004/0256103 | A1 | 12/2004 | Batarseh |
| 2005/0259512 | A1 | 11/2005 | Mandal |
| 2006/0016592 | A1 | 1/2006 | Wu |
| 2006/0106541 | A1 | 5/2006 | Hassan et al. |
| 2006/0144620 | A1 | 7/2006 | Cooper |
| 2006/0185843 | A1 | 8/2006 | Smith |
| 2006/0249307 | A1 | 11/2006 | Ritter |
| 2007/0131591 | A1 | 6/2007 | Pringle |
| 2007/0137852 | A1 | 6/2007 | Considine et al. |
| 2007/0187089 | A1 | 8/2007 | Bridges |
| 2007/0204994 | A1 | 9/2007 | Wimmersperg |
| 2007/0289736 | A1 | 12/2007 | Kearl et al. |
| 2008/0007421 | A1 | 1/2008 | Liu et al. |
| 2008/0047337 | A1 | 2/2008 | Chemali et al. |
| 2008/0173480 | A1 | 7/2008 | Annaiyappa et al. |
| 2008/0190822 | A1 | 8/2008 | Young |
| 2008/0308282 | A1 | 12/2008 | Standridge et al. |
| 2009/0164125 | A1 | 6/2009 | Bordakov et al. |
| 2009/0178809 | A1 | 7/2009 | Jeffryes et al. |
| 2009/0259446 | A1 | 10/2009 | Zhang et al. |
| 2010/0089583 | A1 | 4/2010 | Xu et al. |
| 2010/0276209 | A1 | 11/2010 | Yong et al. |
| 2010/0282511 | A1 | 11/2010 | Maranuk |
| 2011/0011576 | A1 | 1/2011 | Cavender et al. |
| 2011/0120732 | A1 | 5/2011 | Lurie |
| 2012/0012319 | A1 | 1/2012 | Dennis |
| 2012/0055711 | A1 * | 3/2012 | Brannigan .............. E21B 47/08 |
| | | | 175/50 |
| 2012/0111578 | A1 | 5/2012 | Tverlid |
| 2012/0132418 | A1 | 5/2012 | McClung |
| 2012/0173196 | A1 | 7/2012 | Miszewski |
| 2012/0222854 | A1 | 9/2012 | McClung, III |
| 2012/0273187 | A1 | 11/2012 | Hall |
| 2013/0008653 | A1 | 1/2013 | Schultz et al. |
| 2013/0008671 | A1 | 1/2013 | Booth |
| 2013/0025943 | A1 | 1/2013 | Kumar |
| 2013/0076525 | A1 | 3/2013 | Vu et al. |
| 2013/0125642 | A1 | 5/2013 | Parfitt |
| 2013/0126164 | A1 | 5/2013 | Sweatman et al. |
| 2013/0213637 | A1 | 8/2013 | Kearl |
| 2013/0255936 | A1 | 10/2013 | Statoilydro et al. |
| 2014/0083771 | A1 | 3/2014 | Clark |
| 2014/0183143 | A1 | 7/2014 | Cady et al. |
| 2014/0231147 | A1 | 8/2014 | Bozso et al. |
| 2014/0246235 | A1 | 9/2014 | Yao |
| 2014/0251894 | A1 | 9/2014 | Larson et al. |
| 2014/0278111 | A1 | 9/2014 | Gertie et al. |
| 2014/0291023 | A1 | 10/2014 | Edbmy |
| 2014/0333754 | A1 | 11/2014 | Graves et al. |
| 2014/0360778 | A1 | 12/2014 | Batarseh |
| 2014/0375468 | A1 | 12/2014 | Wilkinson et al. |
| 2015/0020908 | A1 | 1/2015 | Warren |
| 2015/0021240 | A1 | 1/2015 | Wardell et al. |
| 2015/0083422 | A1 | 3/2015 | Pritchard |
| 2015/0091737 | A1 | 4/2015 | Richardson et al. |
| 2015/0101864 | A1 | 4/2015 | May |
| 2015/0159467 | A1 | 6/2015 | Hartman et al. |
| 2015/0211362 | A1 | 7/2015 | Rogers |
| 2015/0267500 | A1 | 9/2015 | Van Dongen |
| 2015/0290878 | A1 | 10/2015 | Houben et al. |
| 2015/0323697 | A1 * | 11/2015 | Ohmer ..................... G01V 3/30 |
| | | | 324/333 |
| 2016/0053572 | A1 | 2/2016 | Snoswell |
| 2016/0076357 | A1 | 3/2016 | Hbaieb |
| 2016/0115783 | A1 | 4/2016 | Zeng et al. |
| 2016/0153240 | A1 | 6/2016 | Braga et al. |
| 2016/0160106 | A1 | 6/2016 | Jamison et al. |
| 2016/0237810 | A1 | 8/2016 | Beaman et al. |
| 2016/0247316 | A1 | 8/2016 | Whalley et al. |
| 2016/0356125 | A1 | 12/2016 | Bello et al. |
| 2017/0161885 | A1 | 6/2017 | Parmeshwar et al. |
| 2017/0234104 | A1 | 8/2017 | James |
| 2017/0292376 | A1 | 10/2017 | Kumar et al. |
| 2017/0314335 | A1 | 11/2017 | Kosonde et al. |
| 2017/0328196 | A1 | 11/2017 | Shi et al. |
| 2017/0328197 | A1 | 11/2017 | Shi et al. |
| 2017/0342776 | A1 | 11/2017 | Bullock et al. |
| 2017/0350201 | A1 | 12/2017 | Shi et al. |
| 2017/0350241 | A1 | 12/2017 | Shi |
| 2018/0010030 | A1 | 1/2018 | Ramasamy et al. |
| 2018/0010419 | A1 | 1/2018 | Livescu et al. |
| 2018/0171772 | A1 | 6/2018 | Rodney |
| 2018/0187498 | A1 | 7/2018 | Soto et al. |
| 2018/0265416 | A1 | 9/2018 | Ishida et al. |
| 2018/0326679 | A1 | 11/2018 | Weisenberg et al. |
| 2019/0049054 | A1 | 2/2019 | Gunnarsson et al. |
| 2019/0101872 | A1 | 4/2019 | Li |
| 2019/0227499 | A1 | 7/2019 | Li et al. |
| 2019/0257180 | A1 | 8/2019 | Kriesels et al. |
| 2019/0301258 | A1 * | 10/2019 | Li ........................... E21B 47/09 |

(56) References Cited

U.S. PATENT DOCUMENTS

| | | | |
|---|---|---|---|
| 2020/0032638 | A1 | 1/2020 | Ezzeddine |
| 2021/0372269 | A1* | 12/2021 | Gooneratne ............ E21B 47/08 |
| 2022/0075088 | A1* | 3/2022 | Beard ...................... G01V 3/02 |

FOREIGN PATENT DOCUMENTS

| | | |
|---|---|---|
| CN | 204627586 | 9/2015 |
| CN | 107462222 | 12/2017 |
| CN | 110571475 | 12/2019 |
| EP | 2317068 | 5/2011 |
| EP | 2574722 | 4/2013 |
| EP | 2737173 | 6/2014 |
| GB | 2357305 | 6/2001 |
| GB | 2399515 | 9/2004 |
| GB | 2422125 | 7/2006 |
| GB | 2532967 | 6/2016 |
| JP | 2009067609 | 4/2009 |
| JP | 4275896 | 6/2009 |
| JP | 5013156 | 8/2012 |
| NO | 343139 | 11/2018 |
| NO | 20161842 | 5/2019 |
| RU | 2282708 | 8/2006 |
| WO | WO 2000025942 | 5/2000 |
| WO | WO 2001042622 | 6/2001 |
| WO | WO 2002068793 | 9/2002 |
| WO | WO 2008146017 | 12/2008 |
| WO | WO 2009020889 | 2/2009 |
| WO | WO 2009113895 | 9/2009 |
| WO | WO 2010105177 | 9/2010 |
| WO | WO 2011038170 | 3/2011 |
| WO | WO 2011042622 | 6/2011 |
| WO | WO 2013016095 | 1/2013 |
| WO | WO 2013148510 | 10/2013 |
| WO | WO 2015095155 | 6/2015 |
| WO | WO 2016178005 | 11/2016 |
| WO | WO 2017011078 | 1/2017 |
| WO | WO 2017132297 | 8/2017 |
| WO | WO 2018169991 | 9/2018 |
| WO | WO 2019040091 | 2/2019 |
| WO | WO 2019055240 | 3/2019 |
| WO | WO 2019089926 | 5/2019 |
| WO | WO 2019108931 | 6/2019 |
| WO | WO 2019169067 | 9/2019 |
| WO | WO 2019236288 | 12/2019 |
| WO | WO 2019246263 | 12/2019 |

OTHER PUBLICATIONS

"IADC Dull Grading for PDC Drill Bits," Beste Bit, SPE/IADC 23939, 1992, 52 pages.
Akersolutions, Aker MH CCTC Improving Safety, Jan. 2008.
Anwar et al.,"Fog computing: an overview of big IoT data analytics," Wireless communications and mobile computing, May 2018, 2018: 1-22.
Artymiuk et al., "The new drilling control and monitoring system," Acta Montanistica Slovaca, Sep. 2004, 9(3): 145-151.
Ashby et al., "Coiled Tubing Conveyed Video Camera and Multi-Arm Caliper Liner Damage Diagnostics Post Plug and Perf Frac," Society of Petroleum Engineers, SPE-172622-MS, Mar. 2015, p. 12.
Bilal et al., "Potentials, trends, and prospects in edge technologies: Fog, cloudlet, mobile edge, and micro data centers," Computer Networks, Elsevier, Oct. 2017, 130: 94-120.
Carpenter, "Advancing Deepwater Kick Detection", JPT, vol. 68, Issue 5, May 2016, 2 pages.
Commer et al., "New advances in three-dimensional controlled-source electromagnetic inversion," Geophys. J. Int., 2008, 172: 513-535.
Dickens et al., "An LED array-based light induced fluorescence sensor for real-time process and field monitoring," Sensors and Actuators B: Chemical, Elsevier, Apr. 2011, 158(1): 35-42.
Dong et al., "Dual Substitution and Spark Plasma Sintering to Improve Ionic Conductivity of Garnet Li7La3Zr2O12," Nanomaterials, 9, 721, 2019, 10 pages.
Downholediagnostic.com [online] "Acoustic Fluid Level Surveys," retrieved from URL <https://www.downholediagnostic.com/fluid-level> retrieved on Mar. 27, 2020, available on or before 2018, 13 pages.
edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.
Gemmeke and Ruiter, "3D ultrasound computer tomography for medical imagining," Nuclear Instruments and Methods in Physics Research A 580, Oct. 1, 2007, 9 pages.
Halliburton, "Drill Bits and Services Solutions Catalogs," retrieved from URL: <https://www.halliburton.com/content/dam/ps/public/sdbs/sdbs_contents/Books and Catalogs/web/DBS-Solution.pdf> on Sep. 26, 2019, Copyright 2014, 64 pages.
Ji et al., "Submicron Sized Nb Doped Lithium Garnet for High Ionic Conductivity Solid Electrolyte and Performance of All Solid-State Lithium Battery," doi:10.20944/preprints201912.0307.v1, Dec. 2019, 10 pages.
Johnson et al., "Advanced Deepwater Kick Detection," IADC/SPE 167990, presented at the 2014 IADC/SPE Drilling Conference and Exhibition, Mar. 4-6, 2014, 10 pages.
Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.
King et al., "Atomic layer deposition of TiO2 films on particles in a fluidized bed reactor," Power Technology, vol. 183, Issue 3, Apr. 2008, 8 pages.
Li et al., 3D Printed Hybrid Electrodes for Lithium-ion Batteries, Missouri University of Science and Technology, Washington State University; ECS Transactions, 77 (11) 1209-1218 (2017), 11 pages.
Liu et al., "Flow visualization and measurement in flow field of a torque converter," Mechanic automation and control Engineering, Second International Conference on IEEE, Jul. 15, 2011, 1329-1331.
Liu et al., "Superstrong micro-grained poly crystalline diamond compact through work hardening under high pressure," Appl, Phys. Lett. Feb. 2018, 112: 6 pages.
nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.
Nuth, "Smart oil field distributed computing," The Industrial Ethernet Book, Nov. 2014, 85(14): 1-3.
Olver, "Compact Antenna Test Ranges," Seventh International Conference on Antennas and Propagation IEEE , Apr. 15-18, 1991, 10 pages.
Parini et al., "Chapter 3: Antenna measurements," in Theory and Practice of Modem Antenna Range Measurements, IET editorial, 2014, 30 pages.
petrowiki.org [online], "Kicks," Petrowiki, available on or before Jun. 26, 2015, retrieved on Jan. 24, 2018, retrieved from URL <https://petrowiki.org/Kicks>, 6 pages.
rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.
Ruiter et al., "3D ultrasound computer tomography of the breast: A new era?" European Journal of Radiology 81S1, Sep. 2012, 2 pages.
sageoiltools.com [online] "Fluid Level & Dynamometer Instmments for Analysis due Optimization of Oil and Gas Wells," retrieved from URL <http://www.sageoiltools.com/>, retrieved on Mar. 27, 2020, available on or before 2019, 3 pages.
Schlumberger, "First Rigless ESP Retrieval and Replacement with Slickline, Offshore Congo: Zeitecs Shuttle System Eliminates Need to Mobilize a Workover Rig," slb.com/zeitecs, 2016, 1 page.
Schlumberger, "The Lifting Business," Offshore Engineer, Mar. 2017, 1 page.
Schlumberger, "Zeitecs Shuttle System Decreases ESP Replacement Time by 87%: Customer ESP riglessly retrieved in less than 2 days on coiled tubing," slb.com/zeitecs, 2015, 1 page.

(56) References Cited

OTHER PUBLICATIONS

Schlumberger, "Zeitecs Shuttle System Reduces Deferred Production Even Before ESP is Commissioned, Offshore Africa: Third Party ESP developed fault during installation and was retrieved on rods, enabling operator to continue running tubing without waiting on replacement," slb.com/zeitecs, 2016, 2 pages.

Schlumberger, "Zeitecs Shuttle: Rigless ESP replacement system," Brochure, 8 pages.

Schlumberger, "Zeitecs Shuttle: Rigless ESP replacement system," Schlumberger, 2017, 2 pages.

slb.com' [online] "Technical Paper: ESP Retrievable Technology: A Solution to Enhance ESP Production While Minimizing Costs," SPE 156189 presented in 2012, retrieved from URL <http://www.slb.com/resources/technical_papers/artificial_lift/156189.aspx>, retrieved on Nov. 2, 2018, 1 pages.

slb.com' [online], "Zeitecs Shuttle Rigless ESP Replacement System," retrieved from URL <http://www.slb.com/services/production/artificial_lift/submersible/zeitecs-shuttle.aspx?t=3>, available on or before May 31, 2017, retrieved on Nov. 2, 2018, 3 pages.

Sulzer Metco, "An Introduction to Thermal Spray," Issue 4, 2013, 24 pages.

Wei et al., "The Fabrication of All-Solid-State Lithium-Ion Batteries via Spark Plasma Sintering," Metals, 7, 372, 2017, 9 pages.

wikipedia.org [online] "Optical Flowmeters," retrieved from URL <https://en.wikipedia.org/wiki/Flow_measurement#Optical_flowmeters>, retrieved on Mar. 27, 2020, available on or before Jan. 2020, 1 page.

wikipedia.org [online] "Ultrasonic Flow Meter," retrieved from URL <https://en.wikipedia.org/wiki/Ultrasonic_flow_meter> retrieved on Mar. 27, 2020, available on or before Sep. 2019, 3 pages.

wikipedia.org [online], "Surface roughness," retrieved from URL <https://en.wikipedia.org/wiki/Surface_roughness> retrieved on Apr. 2, 2020, available on or before Oct. 2017, 6 pages.

Xue et al., "Spark plasma sintering plus heat-treatment of Ta-doped Li7La3Zr2O12 solid electrolyte and its ionic conductivity," Mater, Res. Express 7 (2020) 025518, 8 pages.

Zhan et al. "Effect of $\beta$-to-$\alpha$ Phase Transformation on the Microstructural Development and Mechanical Properties of Fine-Grained Silicon Carbide Ceramics." Journal of the American Ceramic Society 84.5, May 2001, 6 pages.

Zhan et al. "Single-wall carbon nanotubes as attractive toughening agents in alumina-based nanocomposites." Nature Materials 2.1, Jan. 2003, 6 pages.

Zhan et al., "Atomic Layer Deposition on Bulk Quantities of Surfactant Modified Single-Walled Carbon Nanotubes," Journal of American Ceramic Society, vol. 91, Issue 3, Mar. 2008, 5 pages.

Zhang et al., "Increasing Polypropylene High Temperature Stability by Blending Polypropylene-Bonded Hindered Phenol Antioxidant," Macromolecules, 51(5), pp. 1927-1936, 2018, 10 pages.

Zhu et al., "Spark Plasma Sintering of Lithium Aluminum Germanium Phosphate Solid Electrolyte and its Electrochemical Properties," University of British Columbia; Nanomaterials, 9, 1086, 2019, 10 pages.

\* cited by examiner

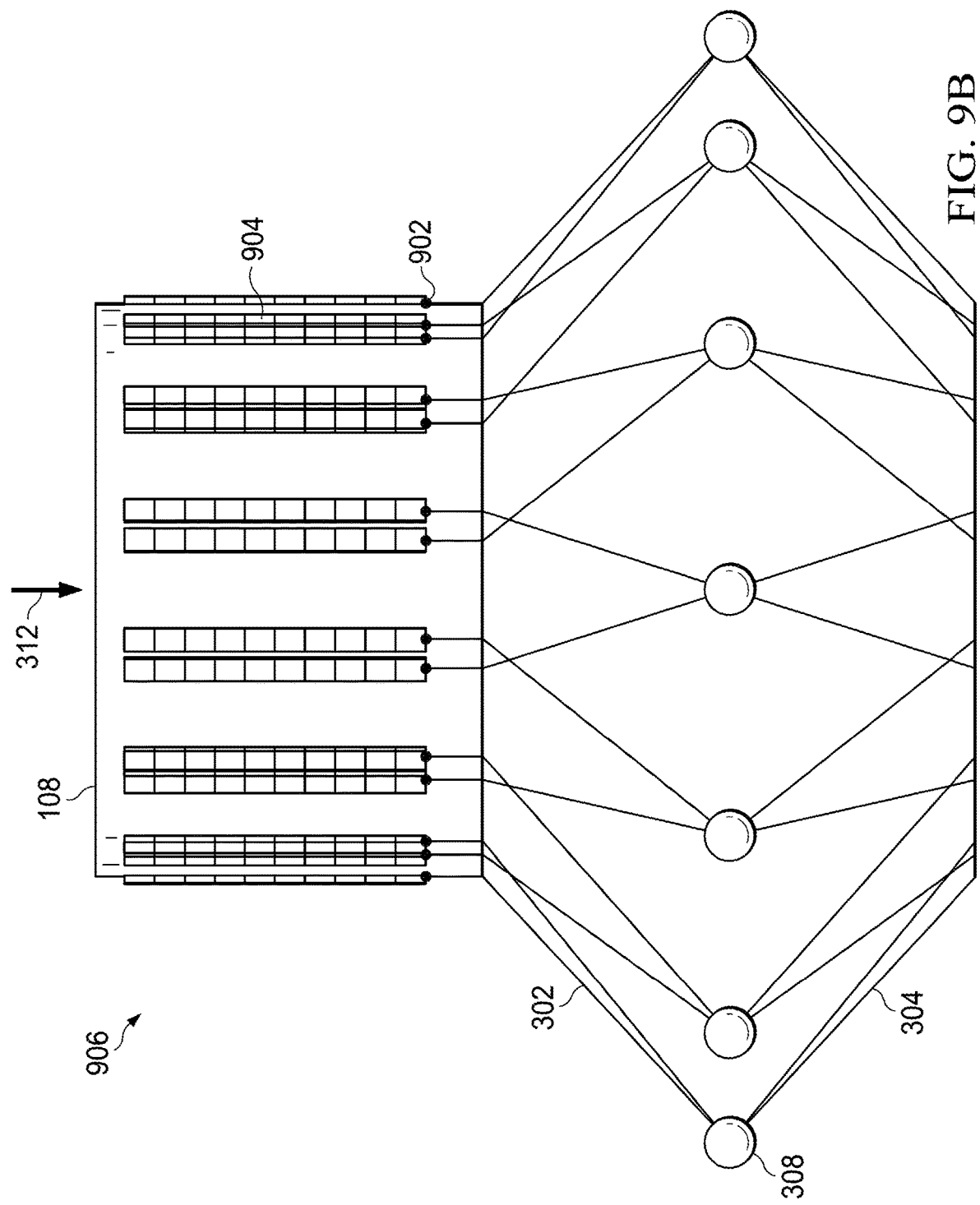

MEASURING WELLBORE CROSS-SECTIONS USING DOWNHOLE CALIPER TOOLS

TECHNICAL FIELD

The present disclosure generally relates to measurement instruments and operations for use in a wellbore, more particularly downhole caliper tools and sensing methods that can be used to obtain the size and shape of a wellbore.

BACKGROUND

Downhole caliper tools may be employed to obtain information about a wellbore. The measurement of an actual wellbore shape while drilling can be a key indicator for predicting downhole problems such as borehole instability. Recognizing variations of a wellbore shape delivers information necessary to revise the drilling program in real-time in order to prevent downhole issues, correct measurement-while-drilling (MWD) and logging-while-drilling (LWD) data, and improve drilling efficiency.

Downhole calipers are commonly used to measure the diameter of a wellbore. Conventional drilling tools often include wireline calipers or ultrasonic calipers. Wireline calipers have pads extending out and pressing against the wellbore to measure the diameter of a wellbore. Ultrasonic calipers offer an alternative by correlating the time taken for the transmitted ultrasonic pulse to echo back to the transceiver after contacting the wellbore.

SUMMARY

This specification describes downhole caliper tools and sensing methods that can be used to obtain a size and shape of a wellbore. These tools can be used as part of a drilling system. The caliper tool is disposed circumferentially about a section of drill pipe to provide downhole formation morphology. This caliper tool includes two collars positioned on either side of a caliper. An outer surface of the caliper extends radially outward (e.g., from the drill pipe) when a movable collar is moved towards a fixed collar and retracts radially inward when the movable collar is moved away from the fixed collar. The caliper tool can be mechanically or hydraulically actuated.

The caliper sensor assembly of these tools has a caliper and a sensor module. The caliper can include wire mesh that can be expandable, stretchable, twistable, or springy. In some tools, the wire mesh includes a top part and a bottom part that are connected and coupled to one another by a plurality of balls. The wires of the top part and the bottom part of the mesh can pass through a hole on one side of the ball and extend out on the other side of the ball. In some tools, the top wire mesh is welded to the bottom wire mesh and they extend out from the holes of the plurality of balls. In some tools, the wire mesh is a one-part mesh with the balls pressing outwards against the wire mesh. In some tools, the wire mesh is welded directly onto the balls.

Although the "balls" are typically spherical, the balls can have other shapes that provide rounded outer edges that allow the caliper tool to smoothly make contact with and move down the wellbore. The sensor module includes sensors, instrumentation and signal processing circuits, receivers, transmitters, and data storing and processing devices.

The wire mesh approach enables high fluid bypass and prevents the accumulation of cuttings. The wire mesh has flexible properties and can be made from metal such as aluminum, copper, steel or nanomaterials such as carbon nanotubes or graphene. The properties of the wire mesh enable the downhole caliper tool to withstand the rigorous conditions of the drilling process and to respond smoothly to contact with the wellbore wall. In some implementations, the top and the bottom parts of the wire mesh are connected and held together by a plurality of metallic balls that allow the downhole caliper tool to operate at high temperatures and high pressures, with high abrasion and wear resistance.

In some aspects, downhole caliper tools for deployment on a drill string to measure wellbore diameter while drilling include: a downhole collar; an uphole collar; and a caliper sensor assembly disposed between the downhole collar and the uphole collar, the caliper sensor assembly including: an annular sensor module defining a plurality of radially extending tracks; and a caliper including: a plurality of linear slide arms, each linear slide arm at least partially disposed in the annular sensor module in one of the plurality of radially extending tracks and radially moveable relative to the annular sensor module, each linear slide arm extending from a first end within the annular sensor module to a second end outside the annular sensor module, and a flexible cover extending from the downhole collar to the uphole collar, the flexible cover in contact with the second end of each of the plurality of linear arms. The annular sensor module can be operable to measure the radial position of the plurality of linear slide arms relative to the annular sensor module.

In some aspects, downhole caliper tools include: a downhole collar; an uphole collar; and a caliper sensor assembly disposed between the downhole collar and the uphole collar, the caliper sensor assembly including: an annular sensor module; a plurality of linear slide arms, each linear slide arm at least partially disposed in the annular sensor module and radially moveable relative to the annular sensor module, each linear slide arm extending from a first end within the annular sensor module to a second end outside the annular sensor module, and a flexible mesh extending from the downhole collar to the uphole collar, the flexible mesh in contact with the second end of each of the plurality of linear arms. The annular sensor module is operable to measure the radial position of the plurality of linear slide arms relative to the annular sensor module.

Embodiments of caliper tools can include one or more of the following features.

In some embodiments, the flexible cover includes a wire mesh. In some cases, the wire mesh includes a first portion extending between the uphole collar and the second end of each of the plurality of linear arms and second portion extending between the downhole collar and the second end of each of the plurality of linear arms.

In some embodiments, the second end of each of the plurality of the linear arms includes a ball.

In some embodiments, the downhole caliper tools also include: a locking mechanism attached to the downhole collar, the locking mechanism configured to fix the downhole collar in position relative to a drill pipe the caliper tool is mounted on.

In some embodiments, the uphole collar has a running position and a sensing position and the uphole collar is farther from the downhole collar in the running position than in the sensing position. In some cases, movement of the uphole collar from the running position to the sensing position axially compresses and radially expands the caliper sensing assembly.

In some embodiments, each linear slide arm of the plurality of linear slide arms is attached to a spring which biases the linear slide arm radially outwards.

In some embodiments, the annular sensor module is coupled to the uphole collar and the downhole collar by springs. In some cases, movement of the uphole collar from the running position to the sensing position axially compresses the springs.

In some embodiments, the annular sensor module is coupled to an outer surface of the uphole collar.

In some embodiments, the caliper sensor assembly includes a plurality of sensors fixed in position in the annular sensor module, each sensor associated with and operable to measure the position of one of the plurality of linear arms relative to the annular sensor module. In some cases, each sensor of the plurality of sensors includes a drive electrode and a ground electrode with one of the drive electrode and the ground electrode mounted the first end of the associated linear arm and the other of the drive electrode and the ground electrode fixed in position on the annular sensor module. In some cases, each sensor of the plurality of sensors includes a magnetic material and a magnetic sensor with one of the magnetic material and the magnetic sensor mounted the first end of the associated linear arm and the other of the magnetic material and the magnetic sensor fixed in position on the annular sensor module. In some cases, each sensor of the plurality of sensors includes a reflector and a transceiver with one of the reflector and the transceiver mounted the first end of the associated linear arm and the other of the reflector and the transceiver fixed in position on the annular sensor module. In some cases, each sensor of the plurality of sensors includes piezoelectric material fixed in position in the annular sensor module. In some cases, each sensor of the plurality of sensors includes a block attached to an inner end of one of the plurality of linear arms. In some cases, each sensor of the plurality of sensors includes a coating with an array of at least two alternating materials.

In some embodiments, the flexible mesh includes a wire mesh.

In some aspects, downhole caliper tools for deployment on a drill string to measure wellbore diameter while drilling include: a downhole collar; an uphole collar having a running position and a sensing position. The uphole collar is farther from the downhole collar in the running position than in the sensing position; and a caliper sensor assembly including: a sensor module defining a plurality of tracks extending parallel to an axis of the caliper tool, the sensor module positioned towards an uphole end of the caliper tool relative to the uphole collar; and a caliper disposed between the downhole collar and the uphole collar including: a flexible mesh extending from the downhole collar to the uphole collar. Movement of the uphole collar from the running position to the sensing position axially compresses and radially expands the flexible mesh. The annular sensor module is operable to measure a size and shape of an outermost portion of the flexible mesh relative to the axis of the caliper tool.

In some aspects, downhole caliper tools include: a downhole collar and an uphole collar having a running position and a sensing position. The uphole collar is farther from the downhole collar in the running position than in the sensing position. A caliper sensor assembly includes a sensor module and a flexible mesh extending from the downhole collar to the uphole collar. Movement of the uphole collar from the running position to the sensing position axially compresses and radially expands the flexible mesh. The annular sensor module is operable to measure a size and shape of an outermost portion of the flexible mesh relative to the axis of the caliper tool.

Embodiments of caliper tools can include one or more of the following features.

In some embodiments, the downhole caliper tool also includes a plurality of balls attached to the flexible mesh halfway between the uphole collar and the downhole collar. In some cases, the sensor module includes a plurality of tracking balls with each tracking ball associated with one of the plurality of tracks extending parallel to the axis of the caliper tool. In some cases, two of the tracking balls are connected by wire to each of the plurality of balls attached to the flexible mesh halfway between the uphole collar and the downhole collar. In some cases, each of the plurality of tracking balls are positioned downhole or uphole along the associated track from the plurality of tracks.

In some embodiments, each of the tracks includes piezoelectric material.

In some embodiments, each of the tracks includes a piezoresistive element.

In some embodiments, each of the tracks includes a periodic array of two or more alternating materials.

In some embodiments, each of the tracks functions as a capacitor with upper electrodes separated from lower electrodes by a dielectric layer.

In some embodiments, the flexible mesh includes a wire mesh.

In some embodiments, the uphole collar has a running position and a sensing position and the uphole collar is farther from the downhole collar in the running position than in the sensing position. In some cases, movement of the uphole collar from the running position to the sensing position axially compresses and radially expands the caliper sensing assembly.

In some aspects, methods of measuring dimensions of a wellbore include: lowering a downhole caliper tool on a drill string into a wellbore, axially compressing and radially expanding a flexible mesh of the downhole caliper; and measuring radial positions of the flexible mesh.

In some embodiments, the downhole caliper tool includes: a downhole collar; an uphole collar; and the flexible mesh extends between the downhole collar and the uphole collar. In some cases, the flexible mesh is part of a caliper sensor assembly that includes: an annular sensor module defining a plurality of radially extending tracks; and a caliper including a plurality of linear slide arms. In some cases, measuring radial positions of the flexible mesh includes sensing the position of the linear slide arms relative to the radially extending tracks. In some cases, each linear slide arm is at least partially disposed in the annular sensor module in one of the plurality of radially extending tracks and radially moveable relative to the annular sensor module.

In some embodiments, lowering the downhole caliper tool on the drill string into the wellbore includes lowering the downhole caliper tool on the drill string into the wellbore while drilling the wellbore.

In some embodiments, axially compressing and radially expanding a flexible mesh of the downhole caliper includes biasing the flexible mesh radially outward using springs attached to a plurality of linear slide arms.

In some embodiment, methods include locking the downhole collar in position relative to a drill pipe the caliper tool is mounted on.

The devices, systems, and methods described in this specification can accurately obtain the size and shape of a wellbore and provide downhole formation morphology while drilling. The downhole caliper tools can be run in hole as part of a measurement-while-drilling (MWD)/logging-while-drilling (LWD) assembly. These downhole caliper tools can provide accurate measurements of wellbore sizes and shapes in all types of drilling fluids as well as a 3D representation of an imaged space.

These caliper tools can provide better accuracy than tools that rely on pads extending out and pressing against the wellbore or ultrasonic signals to measure the size and shape of a wellbore. These tools provide measurements with increased accuracy due to their ability to withstand the forces imposed by the rotating drilling assembly that affect other mechanical calipers. They also avoid the effects imposed by a layer of drilling fluid formed within the wall of the hole (i.e., mud cake) when liquid from mud filters into the formation that impact ultrasonic calipers. This improved accuracy allows some of the critical issues such as including washout, ellipticity, breakout, and spiral-hole conditions to be prevented. The information provided by these caliper tools enables revisions to a drilling plan including reaming a critical zone, changing the drilling fluid flow rate to reduce erosion, modifying the drillstring speed to reduce vibrations and calibrating MWD/LWD measurements. Accurate measurement of wellbore diameter after drilling a section can be used to estimate the volume of cement needed for the casing and cementing operation and for evaluation of mechanical formation properties such as breakout and fracture orientation determination. Wellbores generally have a circular cross-section so the "diameter" is used as shorthand for the cross-sectional size and shape of a wellbore. The use of the term "diameter" does not imply that the wellbore being measured has a circular cross-section.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIGS. 9A and 9B are schematic views of a caliper sensor assembly of a downhole caliper tool that includes segmented tracks in its sensor module, in its uncompressed state and in its compressed state, respectively.

DETAILED DESCRIPTION

This specification describes downhole caliper tools and sensing methods that can be used to obtain a diameter of a wellbore. These tools can be used as part of a drilling system. The caliper tool is disposed circumferentially about a section of drill pipe to provide downhole formation morphology. The caliper tool includes two collars and a caliper sensor assembly. The caliper sensor assembly includes a caliper and a sensor module. The caliper is positioned between the two collars in a compressed state. An outer surface of the caliper extends radially outward (e.g., from the drill pipe) when the uphole collar is moved towards the downhole collar into a sensing position and retracts radially inward when the uphole collar is moved away from the downhole collar into a running position. The caliper tool can be mechanically or hydraulically actuated.

The caliper sensor assembly of these caliper tools can include wire mesh that can be expandable, stretchable, twistable, or springy. In some tools, the wire mesh includes a top part and a bottom part that are connected and coupled to one another by a plurality of balls. The balls allow the caliper tool to smoothly make contact with and move down the wellbore. The caliper sensor assembly of the caliper tool also includes a sensor module with sensors, instrumentation and signal processing circuits, receivers, transmitters, and data storing and processing devices.

Figure 1:
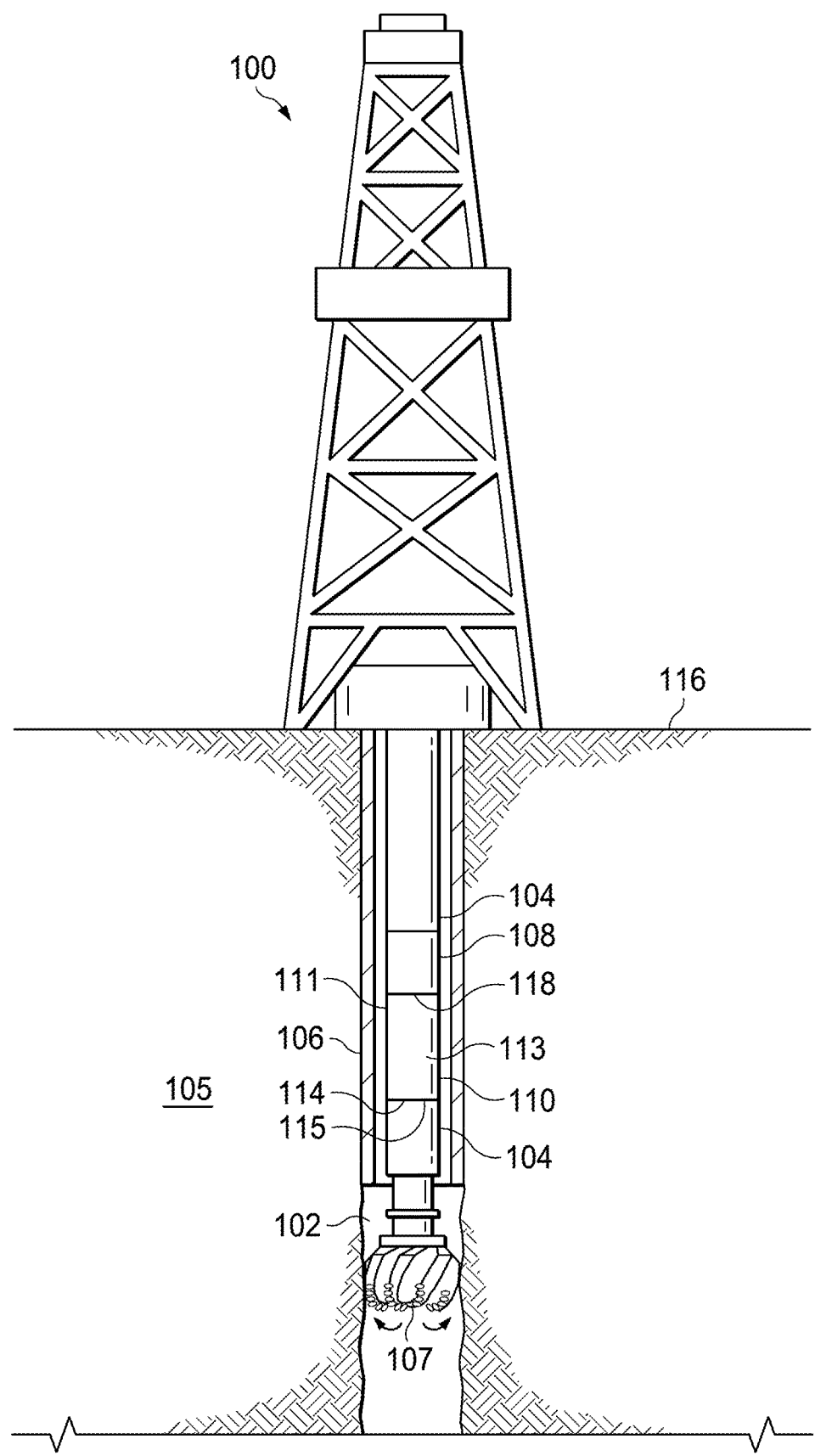
FIG. 1 is a schematic of a drilling system including a downhole caliper tool.

FIG. 1 is a schematic of a drilling system 100 including a downhole caliper tool 111 being run into a wellbore 102 with a casing 106. The downhole caliper tool 111 measures and senses a diameter 208 of a wellbore 102. The drilling system 100 includes a drill pipe 104, a drill bit 107 and the downhole caliper tool 111. The downhole caliper tool 111 includes a caliper sensor assembly 110 with a caliper 113 and a sensor module 108. The caliper 113 is positioned between an uphole collar 118 and a downhole collar 114.

The downhole caliper tool 111 is shown at a downhole location within a wellbore 102 formed in a geologic formation 105.

The terms "uphole" and "downhole" indicate the orientation and position of components when the caliper tool is in use. For example, the uphole collar is the collar that would be uphole when a caliper tool is deployed down a wellbore on a drill string.

The caliper tool 111 is circumferentially disposed around an outer diameter of the drill pipe 104 to provide downhole formation morphology while drilling. An outer surface of the caliper 113 of the caliper sensor assembly 110 of the caliper tool 111 extends radially outward (e.g., away from the drill pipe 104) when the uphole collar 118 moves towards downhole collar 114 and retracts radially inward when the uphole collar 118 is moved away from downhole collar 114. In the caliper tool 111, the uphole collar 118 is moveable along the drill pipe 104 and the downhole collar 114 is fixed in position on the drill pipe 104 by a locking mechanism 115. In some caliper tools, the uphole collar 118 is fixed in position on the drill pipe 104 and the downhole collar 114 is moveable along the drill pipe 104. The caliper tool 111 can be mechanically or hydraulically actuated.

The caliper sensor assembly 110 has a sensor module 108 positioned at the top of the caliper sensor assembly 110. In some sensor assemblies, the sensor module 108 is positioned at the center of the caliper 113.

Figure 2A:
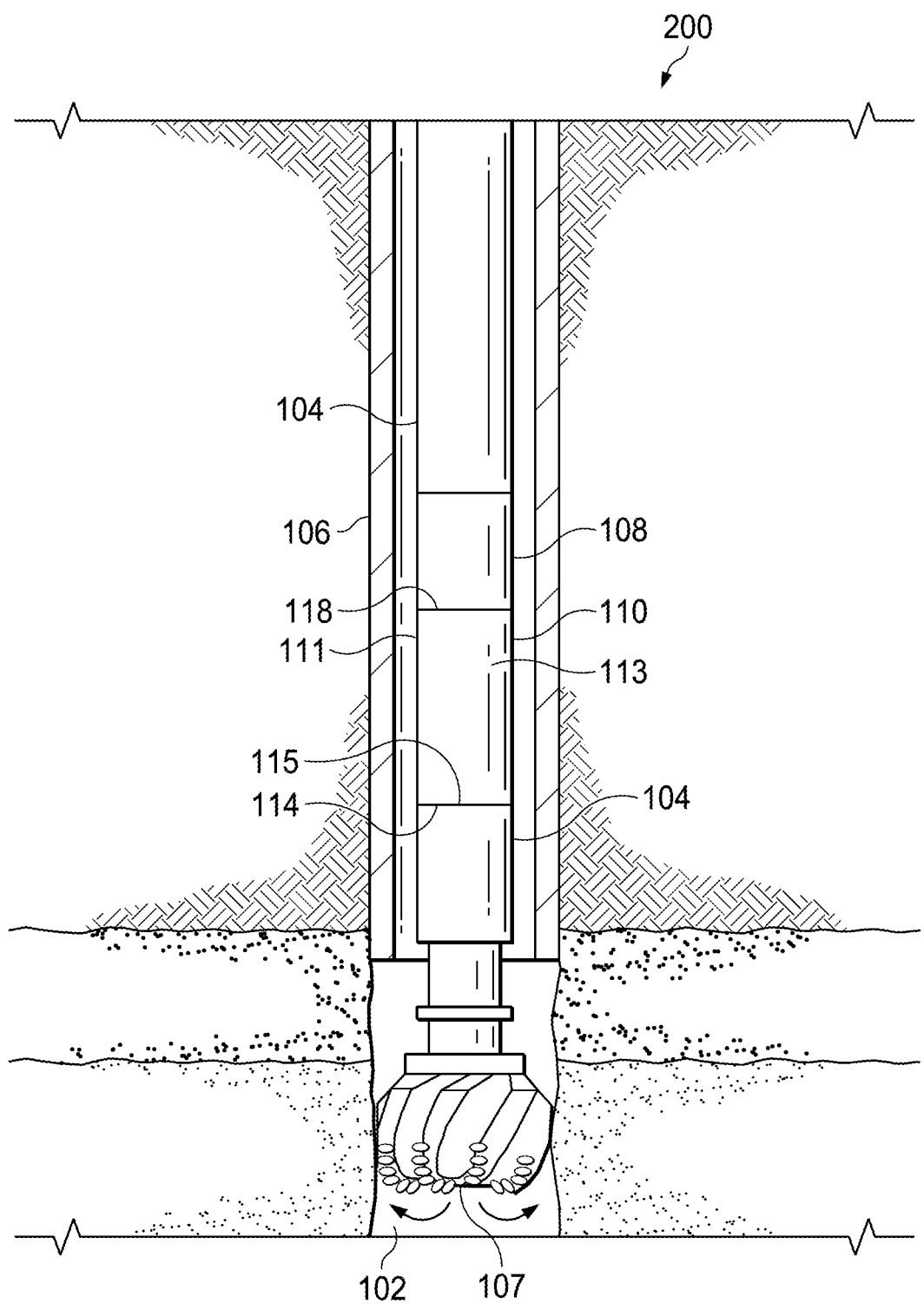
FIGS. 2A and 2B are schematic views of a downhole caliper tool, in its uncompressed state and its compressed state, respectively.
Figure 2B:
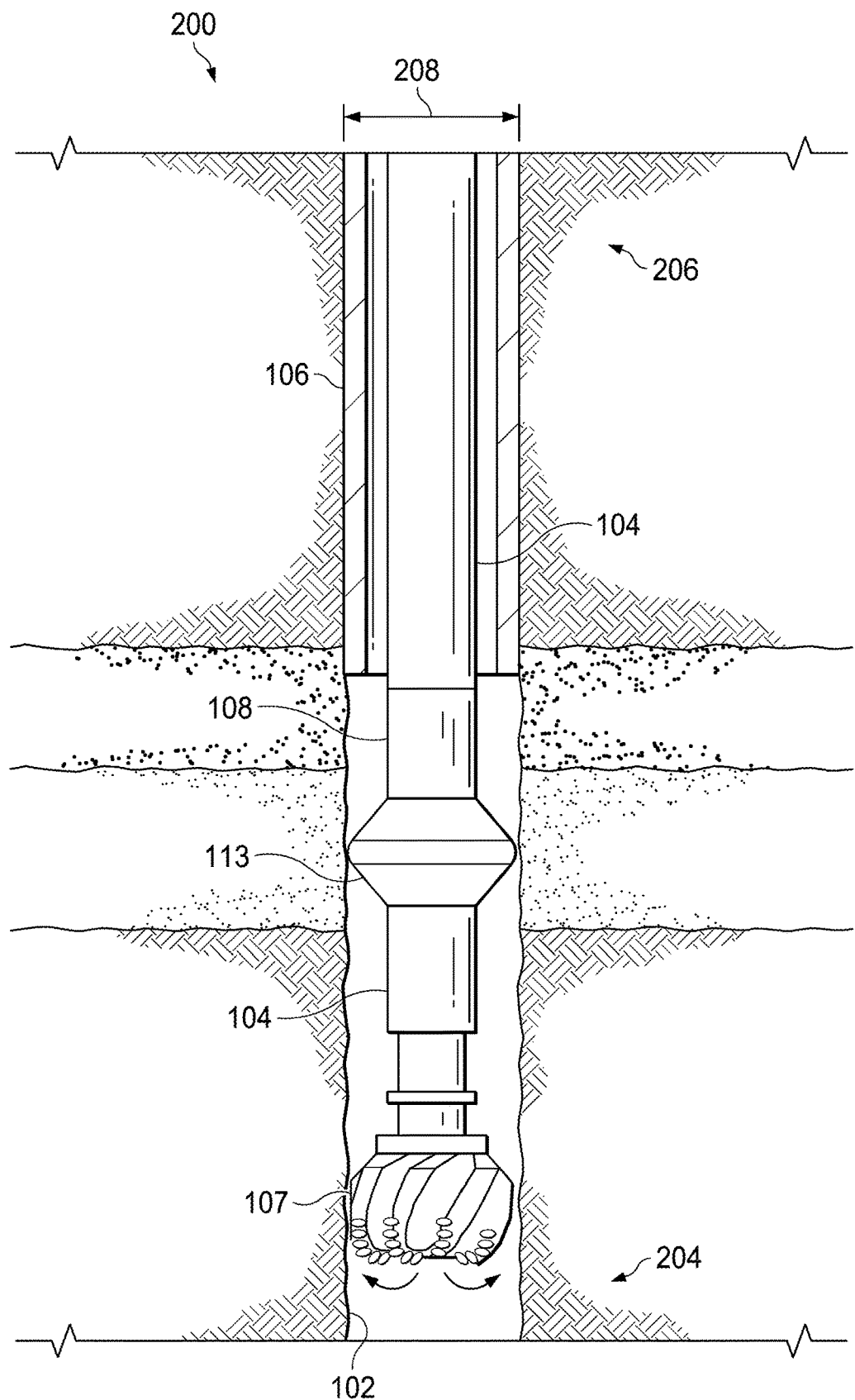

FIGS. 2A and 2B are schematic views of the downhole caliper tool 111, in its uncompressed state and its compressed state, respectively. The caliper 113 is positioned between the uphole collar 118 and the downhole collar 114. The uphole collar 118 is movable and selectively operable to collapse the caliper 113 into its compressed state. The downhole caliper tool 111 is shown being run inside the wellbore 102 on a drill pipe 104. The downhole caliper tool 111 can be used while drilling to form the wellbore. The drill string and downhole caliper tool 111 can be pulled out of the wellbore 102 to run and cement a steel casing 106. When the drill string runs back into the hole through the casing 106, the downhole caliper tool 111 is kept in its retracted state (see FIG. 2A). Once the drill bit 107 and the downhole caliper tool 111 pass the last casing shoe, the uphole collar 118 is moved downhole. This downhole movement axially collapses the caliper 113 to its compressed shape (see FIG. 2B) and radially extends the caliper 113 out to the formation 105 to measure the diameter 208 of the wellbore 102. The downhole caliper tool 111 includes springs that cause an outward movement of the caliper 113. The uphole collar 118 can be moved down by mechanical, hydraulic force or other methods using elements such as packers, snorkels, sliding sleeves, pistons, grippers, blades, rods, and/or ribs controlled, for example, by dropping tags with specific instructions.

Figure 3A:
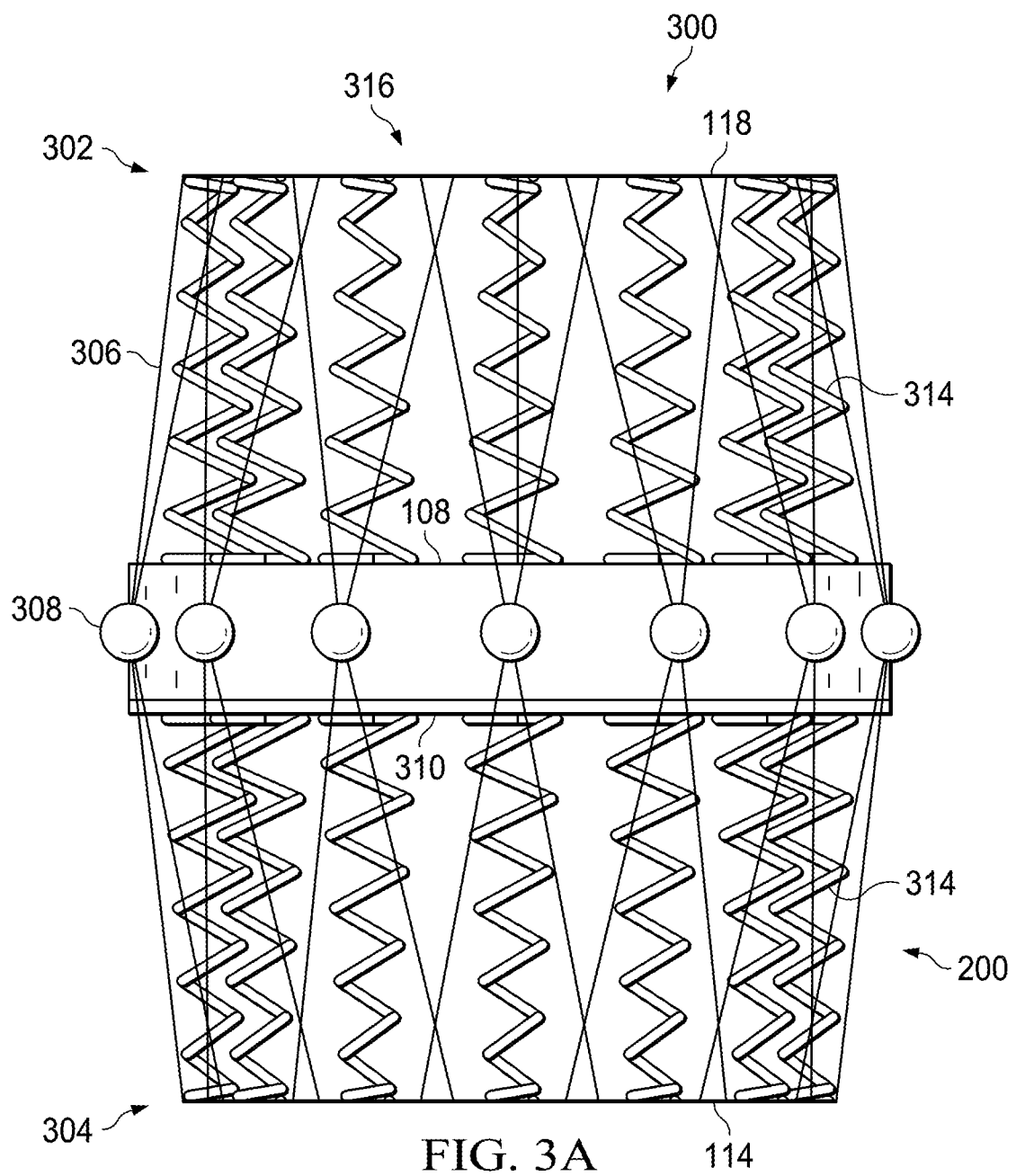
FIGS. 3A and 3B are schematic views of the caliper sensor assembly of the downhole caliper tool, in its uncompressed state and its compressed state, respectively.
Figure 3B:
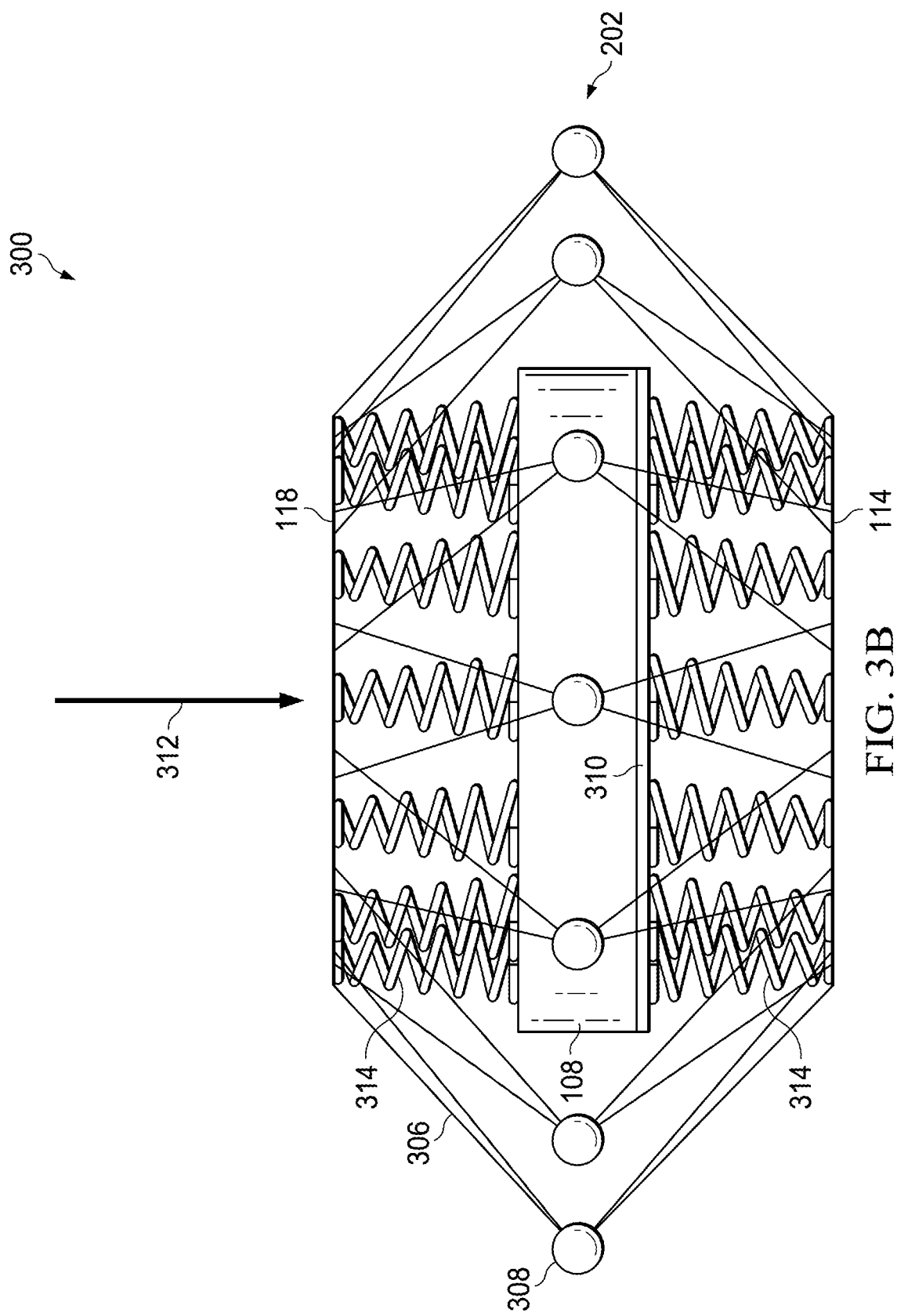
Figure 3E:
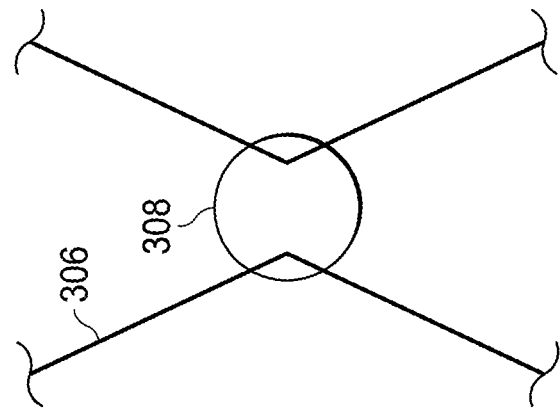
FIGS. 3C-3E are schematic views showing variations of the wire mesh coupling to the balls.
Figure 3D:
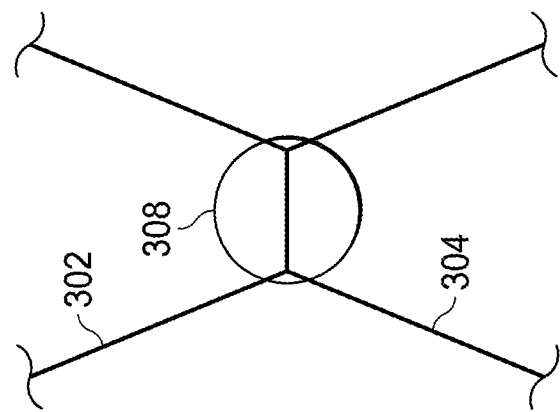
Figure 3C:
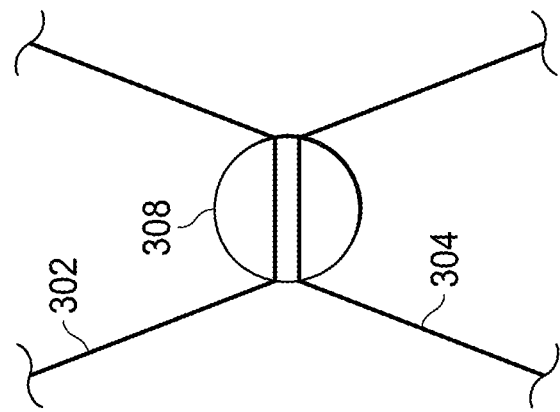

FIGS. 3A and 3B are schematic views of the caliper sensor assembly 110 of the downhole caliper tool 111, in its uncompressed state and its compressed state, respectively. FIGS. 3C-3E are schematic views showing variations of the wire mesh coupling to the plurality of balls. FIG. 3B shows the application of a force 312 by movement of the uphole collar 118. The caliper tool 111 includes a wire mesh 306 and a plurality of balls 308 mounted on linear slide arms (not shown) which extend into the sensor module 108. The sensor module 108 of the caliper sensor assembly 110 is positioned in the middle of the caliper sensor assembly 110. The sensor module 108 is fixed to the collars 114, 118. When the uphole collar 118 moves down, the sensor module 108 moves down too, until the caliper tool 111 is in its axially compressed state (as shown in FIG. 3B). The sensor module 108 can have ball bearings on the inside that enable it to move up and down the drill string assembly. In some caliper tools, the sensor module 108 is fixed on the uphole collar 118 (e.g., caliper tool 111 described with reference to FIGS. 9A and 9B). In some caliper tools, the sensor module 108 is coupled to the outside of the uphole collar 118, in which case it will not be in contact with the drill string assembly and will not require ball bearings on the inside. In general, the sensor module moves when the uphole collar moves.

The wire mesh 306 includes a first portion 302 extending from the uphole collar 118 to the balls 308 and a second portion 304 extending from the uphole collar 118 to the balls 308. The wire mesh 306 enables high fluid bypass past the downhole caliper tool 111 and limits accumulation of cuttings at the downhole caliper tool 111. The wire mesh 306 is expandable, stretchable, twistable and springy. For example, the wire mesh be made from metal-based material such as aluminum, copper, steel, nanomaterial (e.g., carbon nanotubes or graphene), or combinations of these materials. The wire mesh 306 is strong to withstand the drilling process but flexible enough to respond to contact with the wellbore wall 102. For example, commercially available materials that meet these standards include glass fiber reinforced hydrogels and Braeon. The wire mesh 306 can also be made from shape memory materials such as shape-memory alloys, polymers, gels, ceramics, liquid crystal elastomers, MXene, or combinations of these materials. An advantage of the shape-memory materials is their recovery of their original shape after changing their shape due to external force.

The first portion 302 and the second portion 304 of the wire mesh 306 are connected and held together by the balls 308. The wires of the top part 302 and the bottom part 304 of the wire mesh 306 are passing through a hole on one side of the ball 308 and extending out on the other side of the ball 308 (as shown in FIG. 3C). In some tools, the top wire mesh 302 is welded to the bottom wire mesh 304 and together they are extending out from the holes of the plurality of balls 308 (as shown in FIG. 3D). In some tools, the wire mesh is a one-part mesh 306 with the balls 308 pressing outwards against the wire mesh 306 (as shown in FIG. 3E). In some tools, the wire mesh 306 is welded directly onto the plurality of balls 308. The balls 308 are made from steel in order to be able to operate at high temperatures and high pressures (e.g., temperatures greater than 150 degrees Celsius (° C.) and pressures greater than 5000 psi). The balls 308 made from steel have high abrasion and wear resistance. The balls 308 enable the caliper sensor assembly 110 to smoothly make contact with, and move around, the wellbore 102.

The sensor module 108 can be made from materials such as steel, titanium, silicon carbide, aluminum, silicon carbide, Inconel and pyroflask to withstand the harsh downhole environment. The sensor module 108 includes sensors, instrumentation and signal processor circuits (e.g., circuits fabricated on a flexible substrate 310). The flexible substrate 310 can be formed of metal-polymer conductors, organic polymers, printable polymers, metal foils, transparent thin film materials, glass, 2D materials such as graphene and MXene, and silicon or fractal metal dendrites.

FIGS. 4A-4F are schematic views of a portion of a caliper sensor assembly 400 incorporating electromagnetic wave-based sensors. These figures illustrate a portion of the caliper sensor assembly 400 associated one of the balls 308. The ball 308 is positioned between the first portion 302 and the second portion 304 of the wire mesh 306 and attached to an outward end of a linear slide arm 410. The linear slide arm 410 of the caliper sensor assembly 400 has a block 408 on the inward end of the linear slide arm 410. Some systems include linear slide arms without blocks on their inward ends.

Figure 4A:
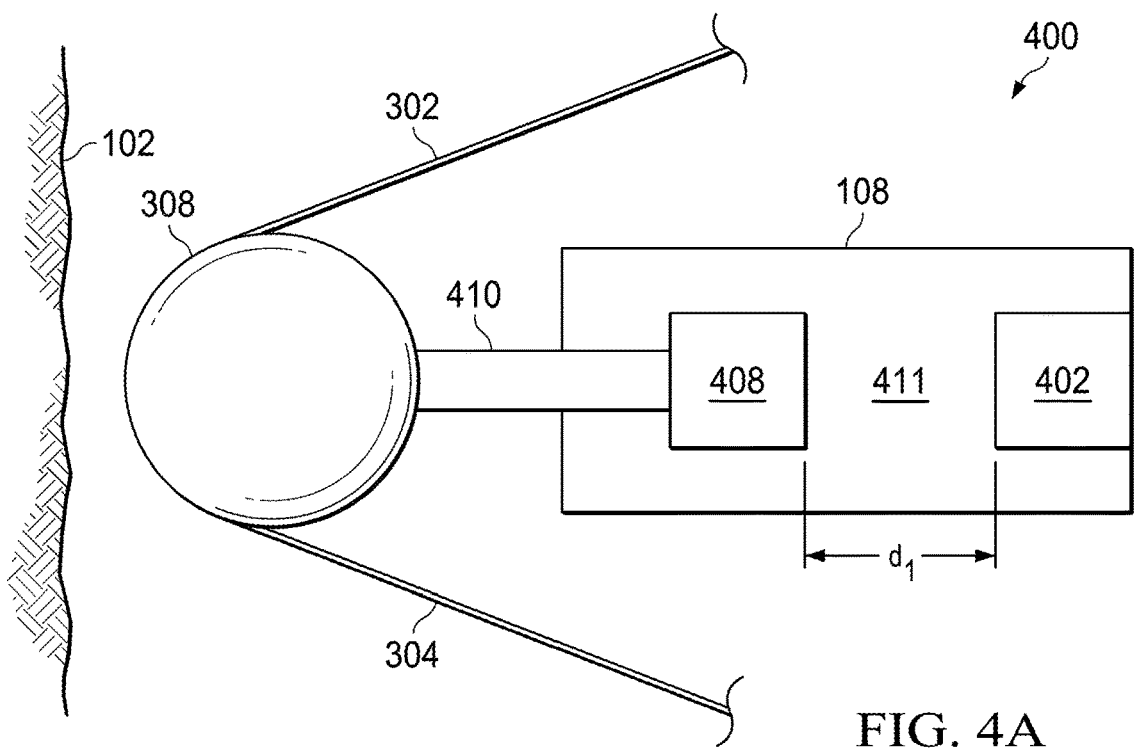
FIGS. 4A-4F are schematic views of a portion of a caliper sensor assembly incorporating electromagnetic wave-based sensors.
Figure 4B:
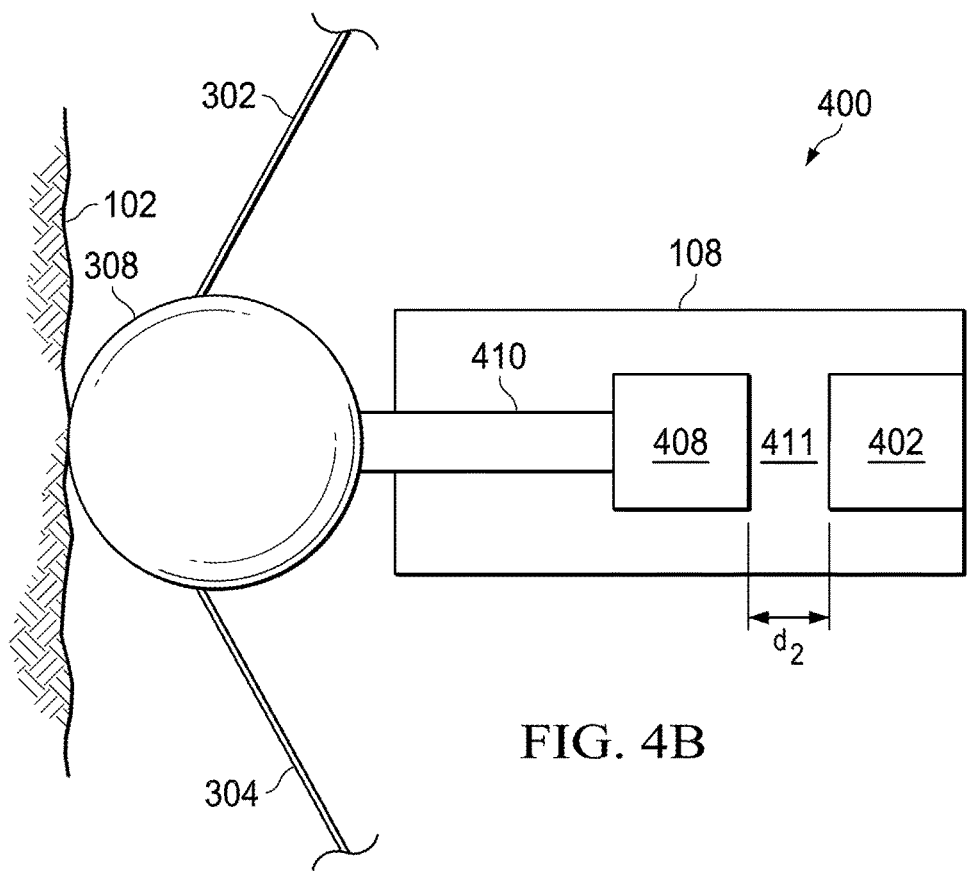
Figure 4C:
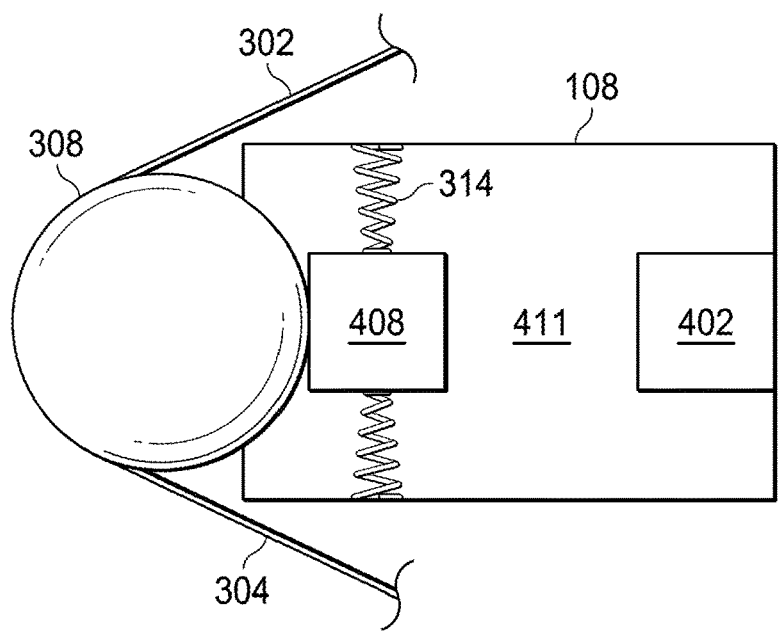
Figure 4D:
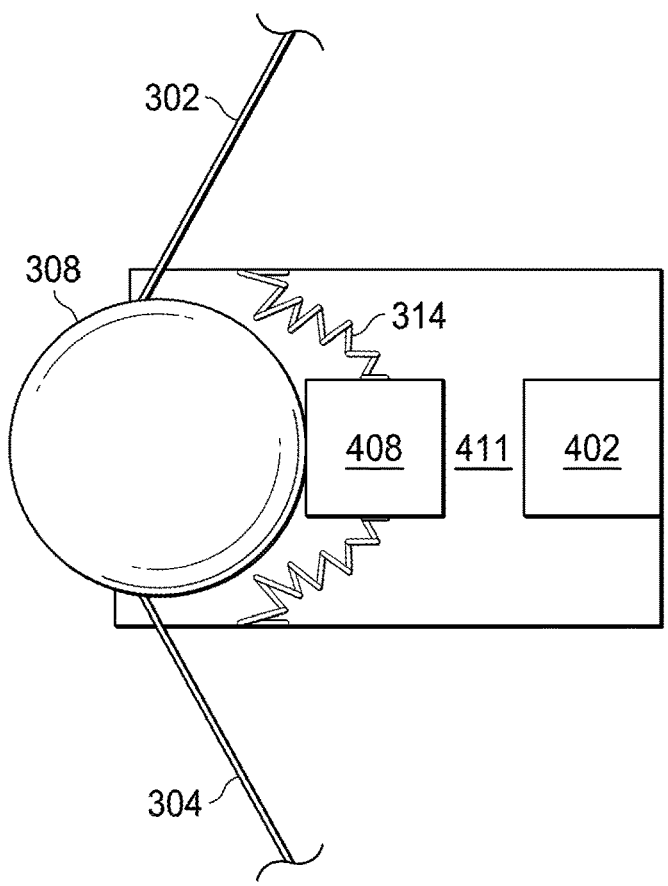
Figure 4E:
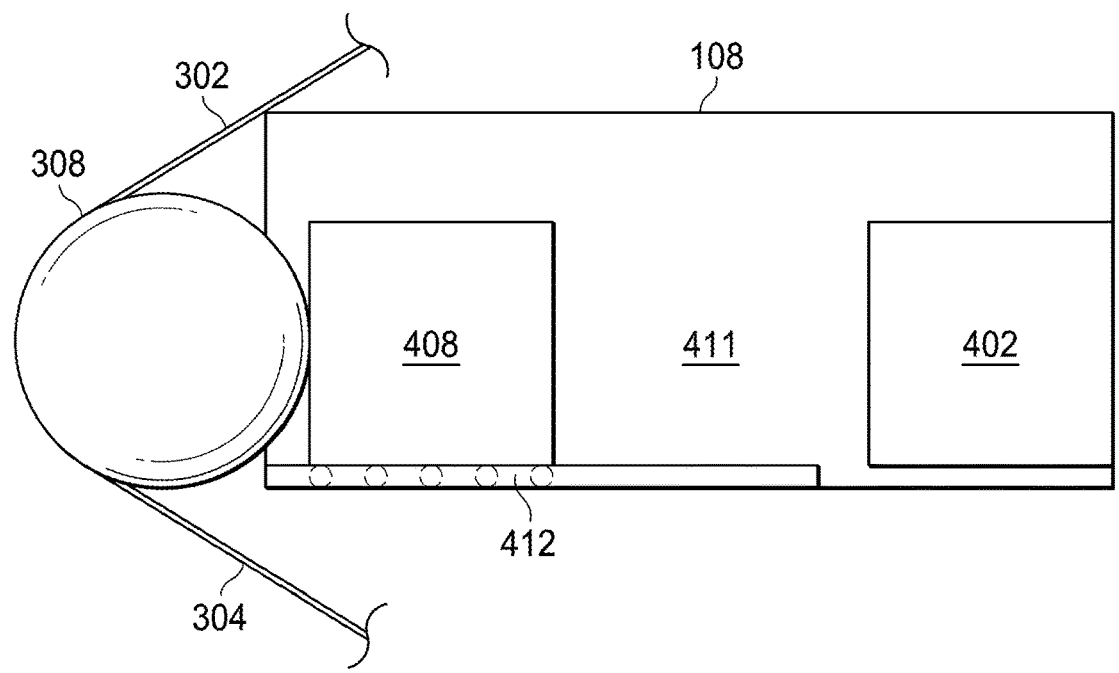
Figure 4F:
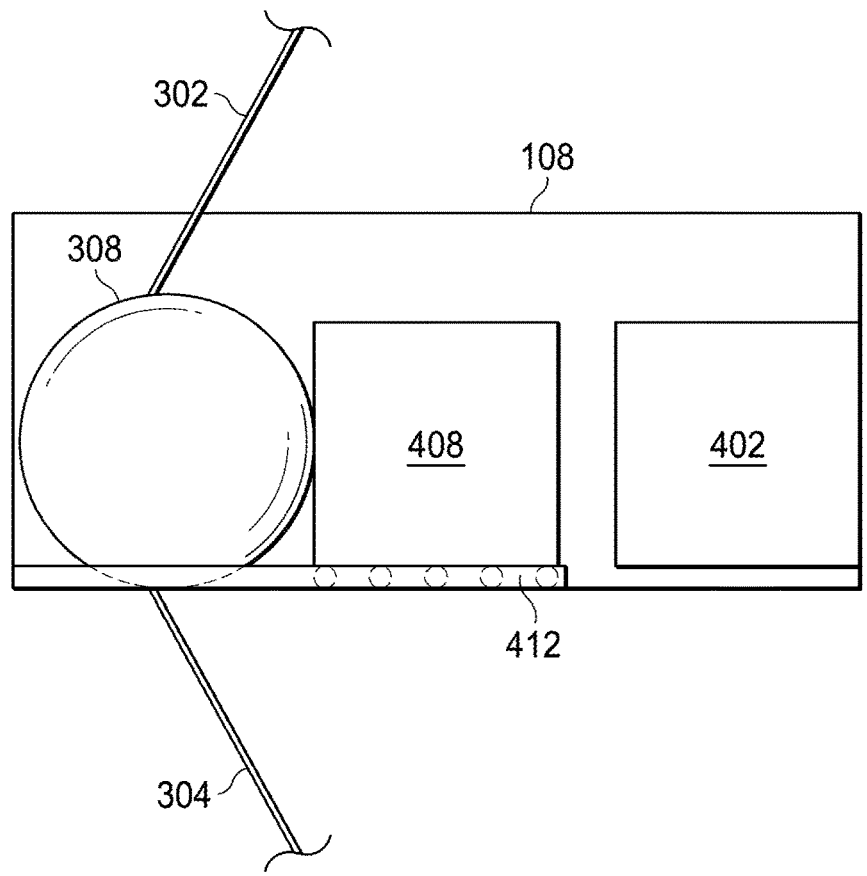

The electromagnetic sensor module 108 defines tracks 411. Each track 411 receives an inward end of one of the linear slide arms 410 and has an electromagnetic sensor 402 associated with the track 411. The electromagnetic sensors 402 are fixed in position. The caliper sensor assembly 400 measures the position of the linear arms 411 by sensing the distance between the inward end of each linear slide arm 410 and the associated electromagnetic sensor 402. In some systems, each electromagnetic sensor 402 generates a signal that is received and interpreted by a central processor of the caliper sensor assembly 400 to determine the position of the associated linear slide arm 410. In some systems, each electromagnetic sensor 402 determines the position of the associated linear slide arm 410 locally and then transmits the determined distance to the central processor of the caliper sensor assembly 400. Some systems do not include the linear slide arms 410 and the block 408 is connected to springs 314 in direct contact with the balls 308 (as shown in FIGS. 4C-4D). When the uphole collar moves down, the balls move outwards. In some systems, movement tracks 412 enable movement of block 408 and the balls 308 that move inwards and outwards (as shown in FIGS. 4E-4F).

In one example, the caliper sensor assembly 400 includes electrode-based sensors. The block 408 include a first electrode and the electromagnetic sensor 402 includes a second electrode. The two electrodes generate a signal that varies with the distance between the electrodes. At the maximum extension of the linear arm 410, the two electrodes are spaced apart from one another by a distance $d_1$. As the diameter 208 of the wellbore 102 changes, the ball 308 makes contact with the wellbore wall 102 as shown in FIG. 4B. The contact pushes the linear slide arm 410 radially inwards in the track 411. Moving the electrode 408 towards electrode 402 changes the distance between the electrodes 402, 408 to a second distance $d_2$. The electrodes 402, 408 function as a parallel-plate capacitor, where one electrode 402 acts as a drive electrode and the other electrode 408 as a ground electrode. The drive electrode 408 may extend as far as the boundary of the housing 108 or beyond if there is a channel that allows electrode 408 to extend inside and outside of the housing 108. When a voltage is applied to the drive electrode 402, an electric field is produced between the drive electrode 402 and the ground electrode 408. The change in the distance between the electrodes 402, 408 is reflected by an increase in the capacitance between the two electrodes 402, 408. The change in the output of the capacitor is correlated with changes in the wellbore diameter 208.

In another example, the block 408 includes magnetic material and the electromagnetic sensor 402 is a MEMS-type magnetic sensor 408 is positioned inside the sensor module 108. The magnetic sensor 402 is able to detect the magnetic field originating from the magnetic material 408. Changes in the distance between the block 408 and the electromagnetic sensor 402 result in signal changes with decreases in the distance between the magnetic material on the block 408 and the magnetic sensor 402 reflected by increase in the magnetic field detected by the magnetic sensor 408. The change in the magnetic field is correlated with changes in the wellbore diameter 208.

In another example, the inward side of the linear slide arm 410 has a block 408 with an acoustic or optical reflector. Optical reflectors can be metallic, dielectric or enhanced metallic material capable of reflecting the majority of transmitted light waves. Acoustic reflectors can be material coated to be flat and rigid so that acoustic waves bounced off the surface create an echo. An optical or acoustic transceiver 402 positioned inside the sensor module 108 measures the time taken for a light or acoustic wave to travel from the transceiver 408 to the reflector and back. Changes in the distance between the block 408 and the electromagnetic sensor 402 result in changes in the time taken. This change in time can be correlated with the changes in the wellbore diameter 208.

Figure 5A:
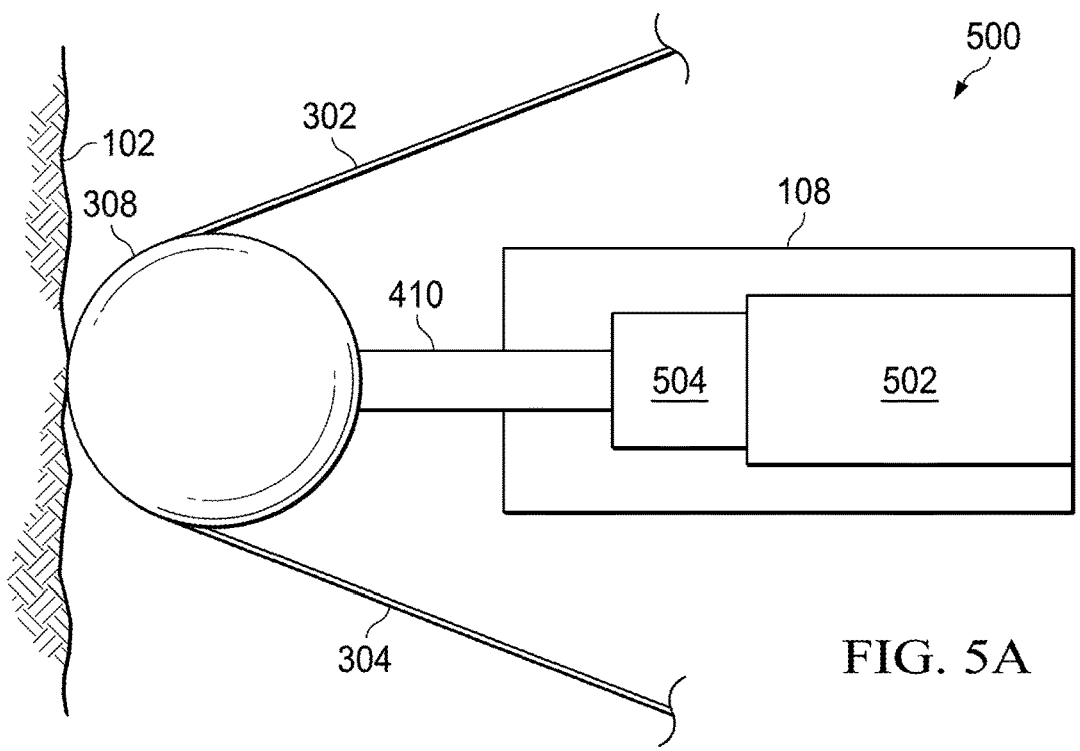
FIGS. 5A and 5B are schematic views of a portion of a caliper sensor assembly incorporating a block of piezoelectric material.
Figure 5B:
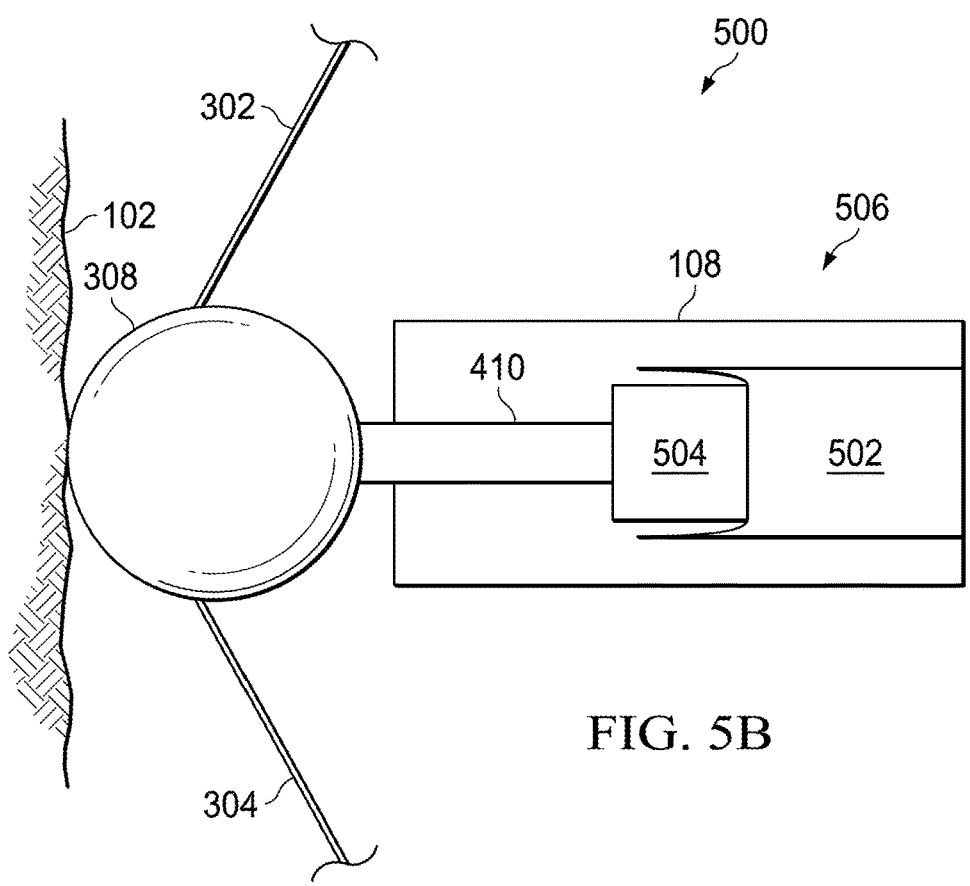

FIGS. 5A and 5B are schematic views of a portion of a caliper sensor assembly 500. The caliper sensor assembly 500 is substantially similar to the caliper sensor assembly 400 but its sensor module incorporates sensors 502 of piezoelectric material in place of the electromagnetic wave-based sensors. A block 504 is attached to the inward end of the linear slide arm 410. The sensor 502 includes material with piezoelectric properties such as quartz, langasite, lithium niobate, titanium oxide, or lead zirconate titanate and is positioned inside the sensor module 108. The block 504 is in direct contact with the sensor 502 when the ball 308 contacts the wellbore wall 102. The mechanical stresses experienced by the piezoelectric material of the sensor 502 due to the contact between the sensor 502 and the block 504 result in the generation of electric charges. As the diameter 208 of the wellbore 102 changes, movement of the linear slide arm 410 inward or outward changes the level of stress applied to the sensor 502 and the resulting electric charges. This change in the electric charges is translated into changes in the wellbore diameter 208.

Figure 6A:
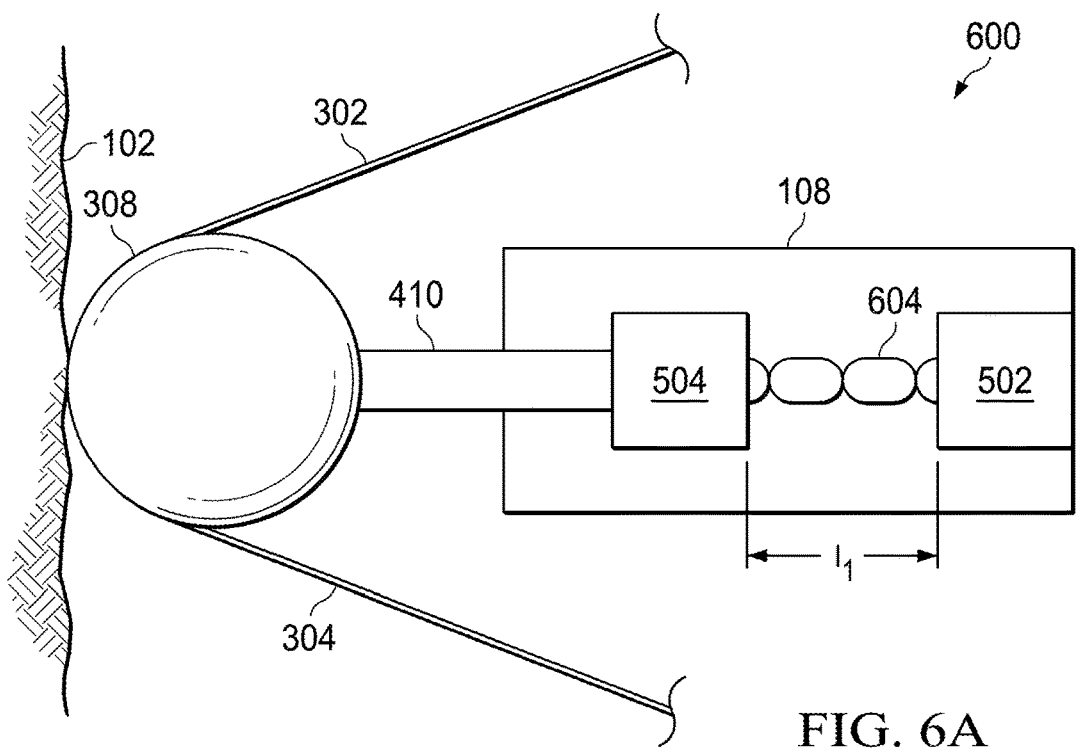
FIGS. 6A and 6B are schematic views of a portion of a caliper sensor assembly incorporating connectors made of piezoelectric material.
Figure 6B:
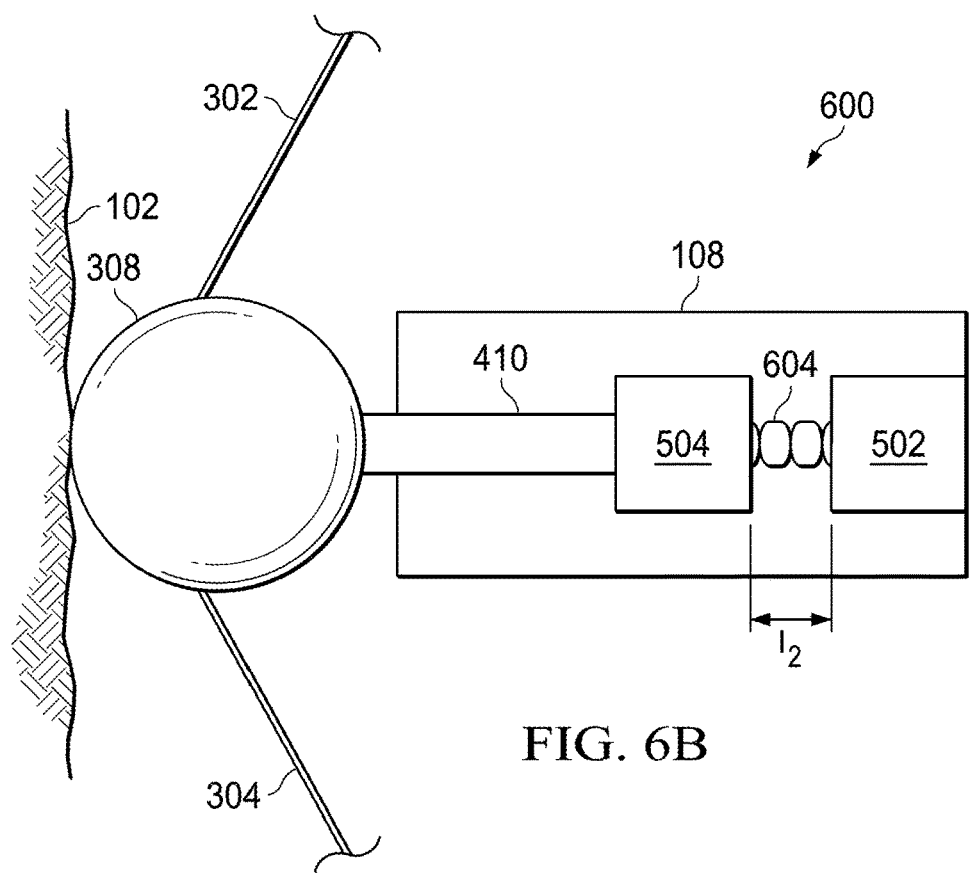

FIGS. 6A and 6B are schematic views of a portion of a caliper sensor assembly 600 incorporating connectors 604 made of piezoelectric material that extend between the inward end of the linear arms and a fixed member in the sensor module. One end of each connector 604 is connected to the block 504 on the associated linear slide arm 410 and the other end is connected to a fixed member 502 inside the sensor module 108. The connector 604 is stretched to a length $l_1$ as the caliper extends outward until there is contact between the ball 308 and the wellbore wall 102. The mechanical stretching experienced by the connector 604 results in the generation of electric charges. As the diameter 208 of the wellbore 102 changes, the linear slide arm 410 moves within the track 411 changing the distance between the block 504 on the inward end of the linear arm and the fixed block 502 (e.g., to length l2 in FIG. 6B). The resulting change in the length of the connector 604 length results in changes in the generated electric charges that can be correlated with changes in the wellbore diameter 208.

In some systems, the connectors 604 are piezoelectric nanoribbons (e.g., ceramic nanoribbons, such as lead zirconate titanate, or piezoelectric material encased in a flexible elastomer). In some systems, the connectors 604 are springs made of piezoelectric material.

Figure 7A:
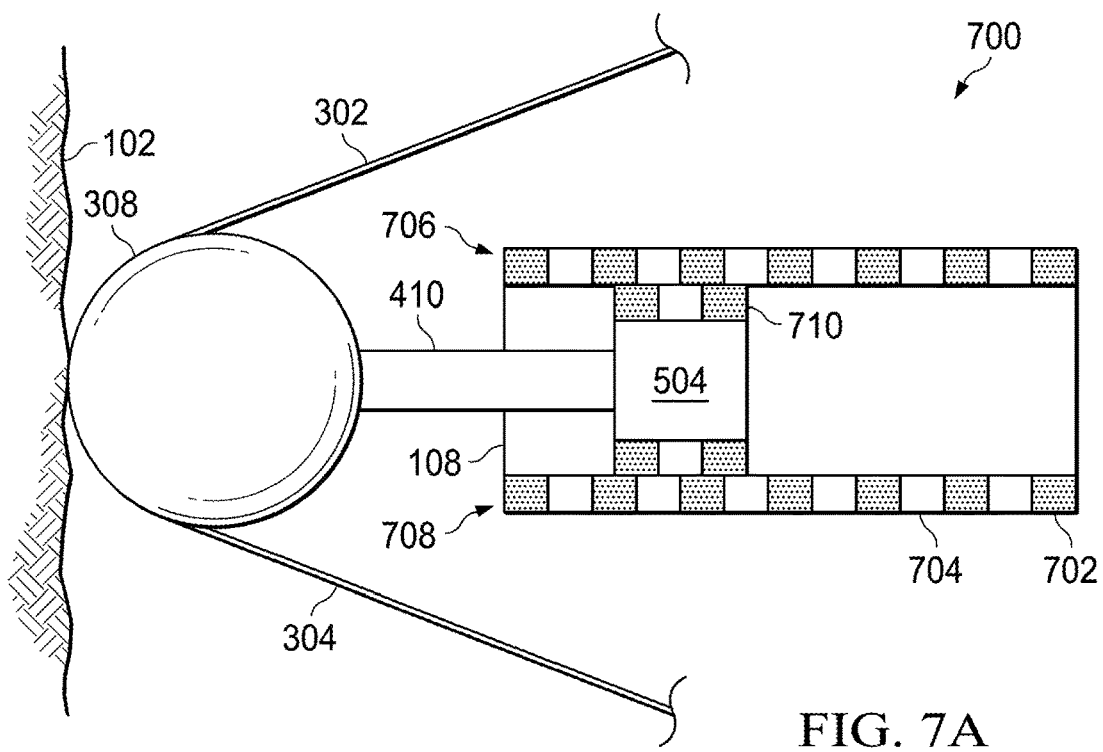
FIGS. 7A and 7B are schematic views of a portion of a caliper sensor assembly incorporating connectors made of piezoresistive material.
Figure 7B:
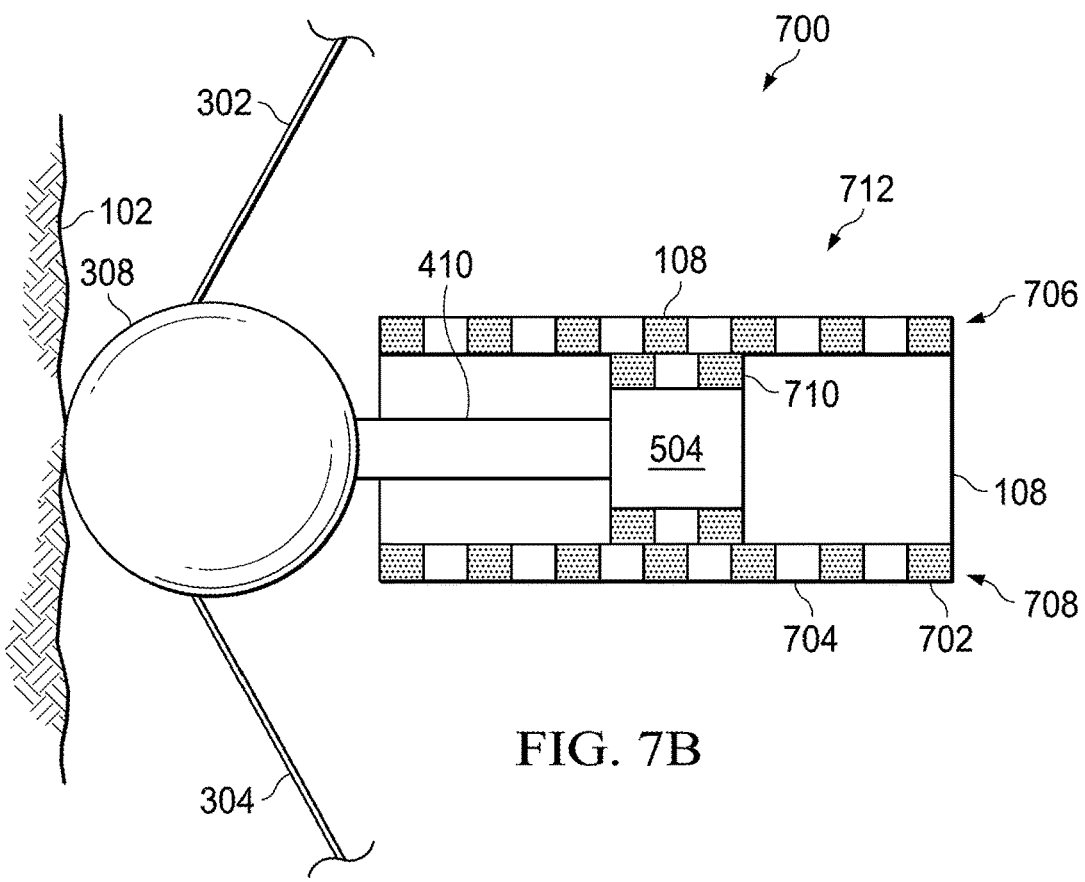

FIGS. 7A and 7B are schematic views of a portion of a caliper sensor assembly 700 with a linear slide arm 410 gradually sliding along a track 411 with walls having coated segments. The caliper sensor assembly 700 is based on the transfer of electrons between materials of different polarities as they move across each other.

The inner walls 706 of the sensor module 108 are coated with periodic arrays of a first material 702 and a second material 704. The outer surface 710 of block 504 is also coated with periodic arrays of the first material 702 and the second material 704. Other approaches are possible. For example, the inner walls 706 of the sensor module 108 of some caliper sensor assemblies are made of the first material 702 and the second material 704 rather than having the first material 702 and the second material 704 coated on the walls. In another example, some caliper sensor assemblies have arrays with more than two different materials.

This approach is most effective when the first material 702 and the second material 704 have polarities that are very different from each other (e.g., opposite polarities). In this approach, electricity is generated by friction when objects become electrically charged as they slide across objects made of another material and charges move from one material to the other. Some materials have a tendency to gain electrons and some to lose electrons. If the first material 702 has a higher polarity than the second material 704, then electrons flow from the second material 704 to the first material 702 resulting in surfaces with opposite charges. When these two materials 702, 704 are separated, there is a current flow and a load is connected between the materials 702,704 due to the imbalance in charges between them. The current flow continues until both materials 702, 704 are at the same potential. When the materials 702, 704 move towards each other again, there will be a current flow but in the opposite direction. As the diameter of the wellbore changes, the motion of the linear arm 410 within the track 411 causes the sliding contact and separation of the first material 702 and the second material 704 and generates electrical pulses. The change in the electrical pulse patterns can be correlated with changes in the wellbore diameter 208.

The first material 702 and the second material 704 can be chosen, for example, from materials such as polyamide, polytetrafluoroethylene (PTFE), polyethylene terephthalate (PET), polydimethylacrylamide (PDMA), polydimethylsiloxane (PDMS), polyimide, carbon nanotubes, copper, silver, aluminum, lead, elastomer, teflon, kapton, nylon or polyester.

Figure 8A:
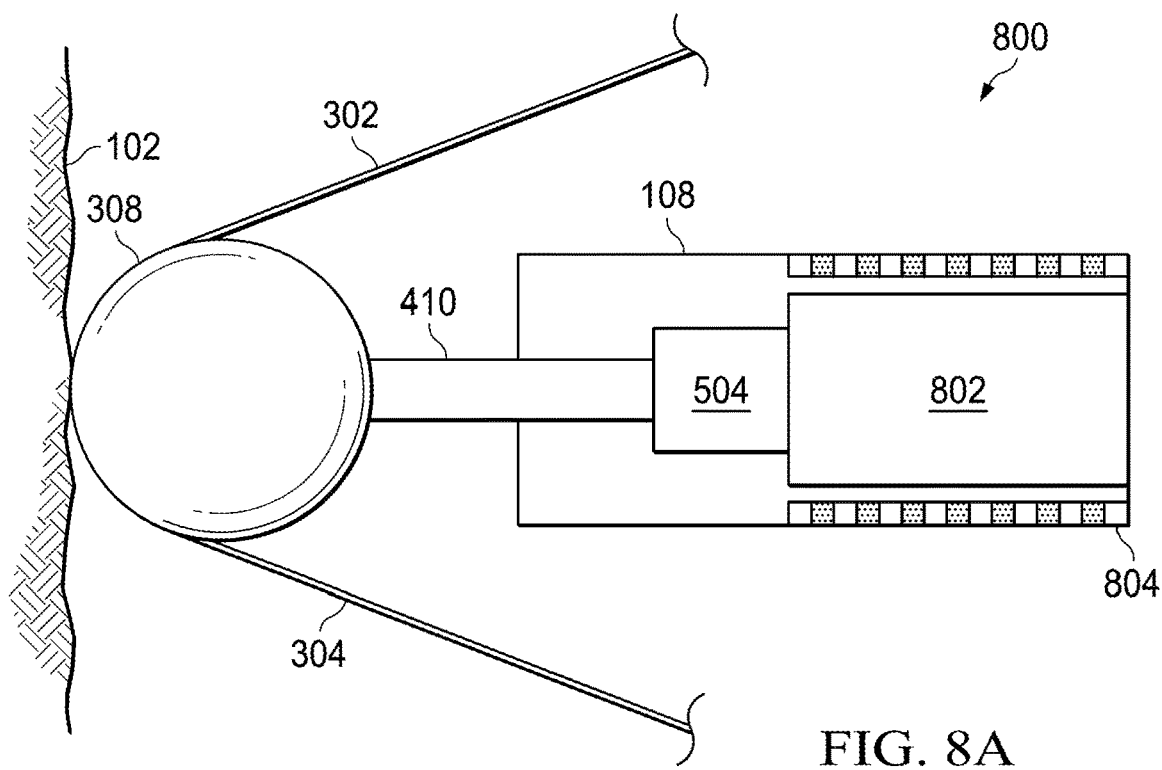
FIGS. 8A and 8B are schematic views of a portion of a caliper sensor assembly with a sensor having magnetostrictive properties.
Figure 8B:
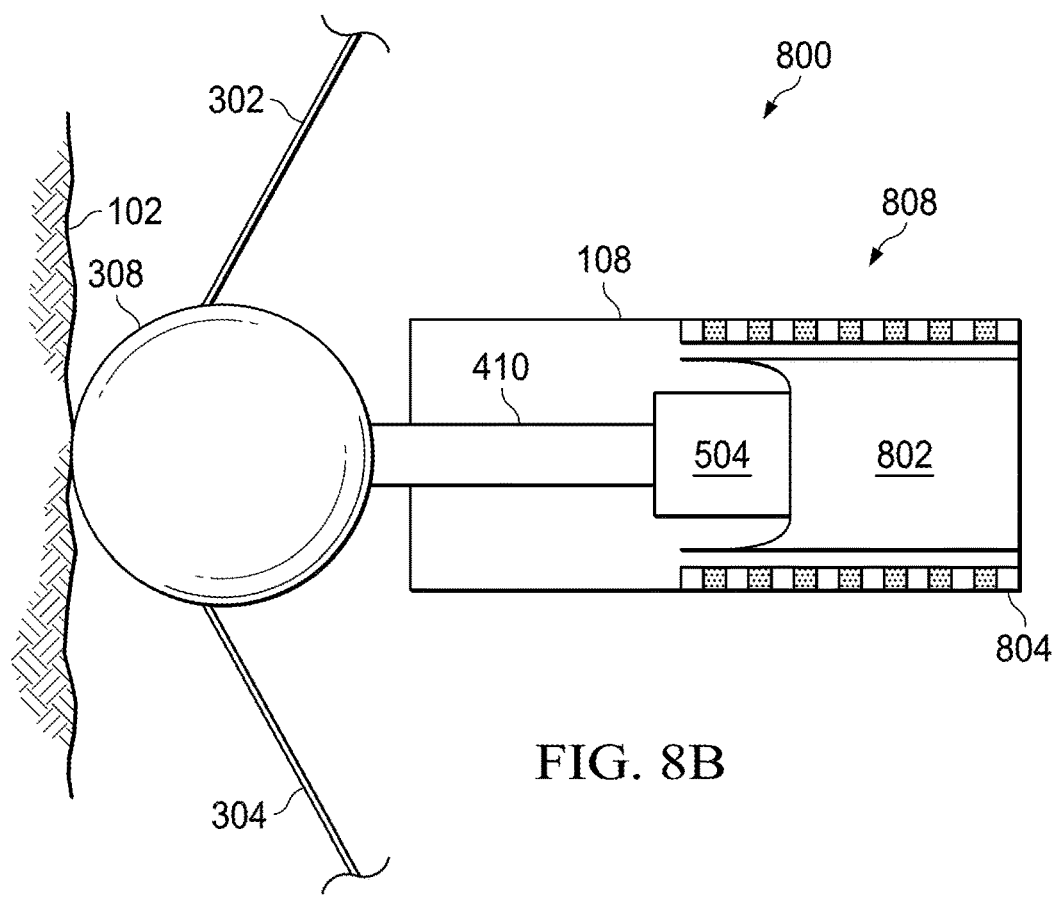

FIGS. 8A and 8B are schematic views of a portion of a caliper sensor assembly 800 with a sensor having magnetostrictive properties. The caliper sensor assembly 800 is substantially similar to the caliper sensor assembly 500 discussed with reference to FIGS. 5A and 5B. However, the caliper sensor assembly 800 has a block 802 formed of a material that has magnetostrictive properties (e.g., Terfenol-D, Galfenol, or Metglas) that is fixed inside the sensor module 108. The mechanical stresses applied to the block 802 by contact between block 504 and block 802 results in a change in the magnetic field of the block 802. This induced magnetic field can be converted to a voltage by a planar pick-up coil 804 or a solenoid placed near the block 802. As the diameter 208 of the wellbore 102 changes, the linear slide arm 410 moves the block 504 relative to the block 802 resulting in the generation of a different voltage. This change in voltage is correlated with changes in the wellbore diameter 208.

Figure 9A:
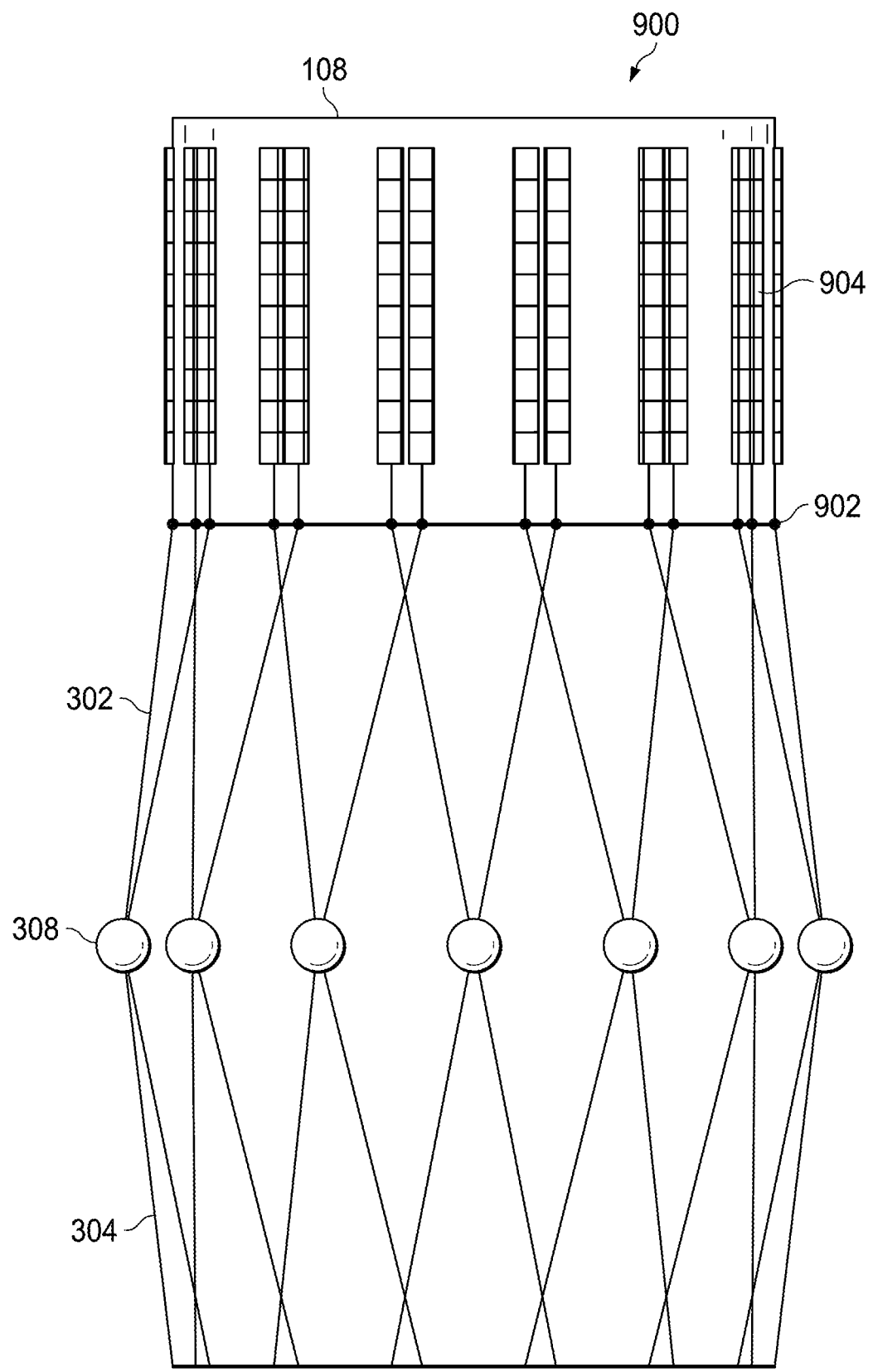

FIGS. 9A and 9B are schematic views of a caliper sensor assembly 900 in its uncompressed state and in its compressed state, respectively. The caliper sensor assembly 900 is substantially similar to the caliper sensor assembly 300 described with reference to FIGS. 3A and 3B. However, the sensor module 108 of the caliper sensor assembly is positioned uphole of the uphole collar rather than aligned with the balls 308. The tracking balls 902 are positioned downhole of the segmented track 904 (as shown in FIG. 9A). In some caliper sensor assembly, the tracking balls 902 are positioned uphole of the segmented track 904, not shown. The tool is calibrated once the caliper is in its compressed state and the tracking balls are positioned either at the top or at the bottom of the segmented track.

The tracks 904 in the sensor module 108 are axially aligned (i.e., aligned with an axis of the caliper tool) and extend along the drill pipe rather than being radially aligned and extending perpendicular to the drill pipe. The tracks 904 are arranged circumferentially around the inner or outer side of the sensor module 108. The uphole end of the first portion 302 of the wire mesh 306 is attached to tracking balls 902 that are in contact with the tracks 904. The tracking balls 902 able to move over and along (i.e., uphole and downhole) the tracks 904 of the sensor module 108.

This configuration enables smaller tracks 904 than the radially extending tracks previously described. This configuration also enables a different, self-powered method of sensing in which the forces applied to the balls 308 are translated into vertical motion of tracking balls 902 resulting in an output signal proportional to the applied force. Further, the presence of the sensor module with plurality of small segments allows for increased range, sensitivity and resolution of the measurements.

Figure 10A:
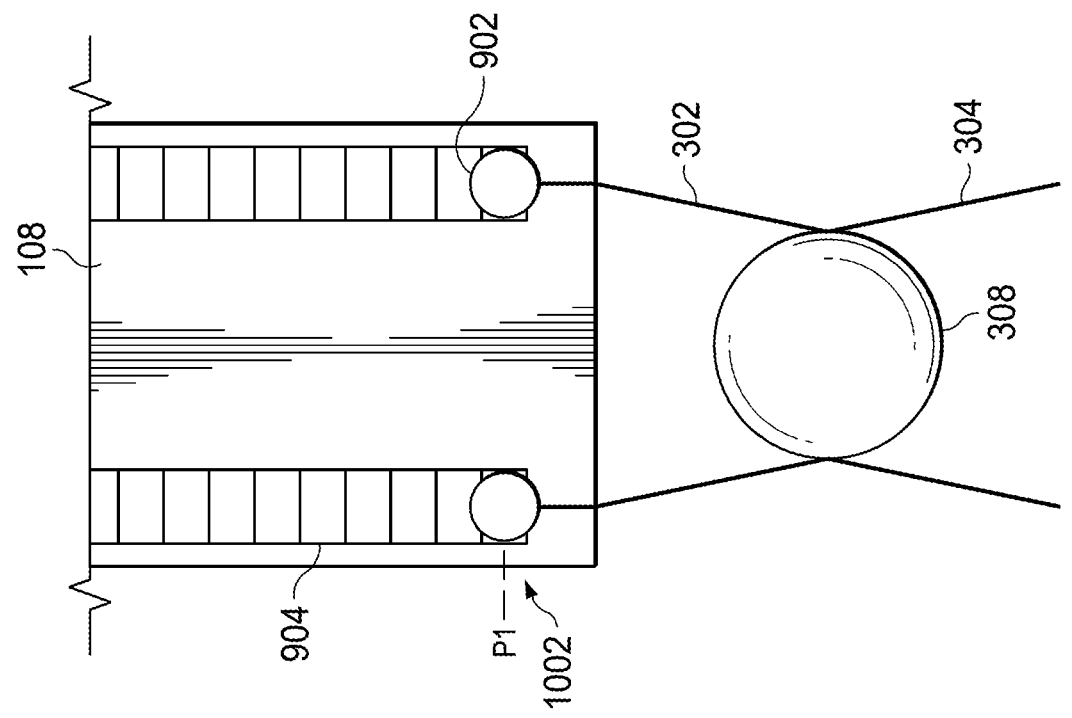
FIGS. 10A and 10B are schematic views of a portion of a caliper sensor assembly with tracking balls disposed in segmented tracks in the sensor module.
Figure 10A:
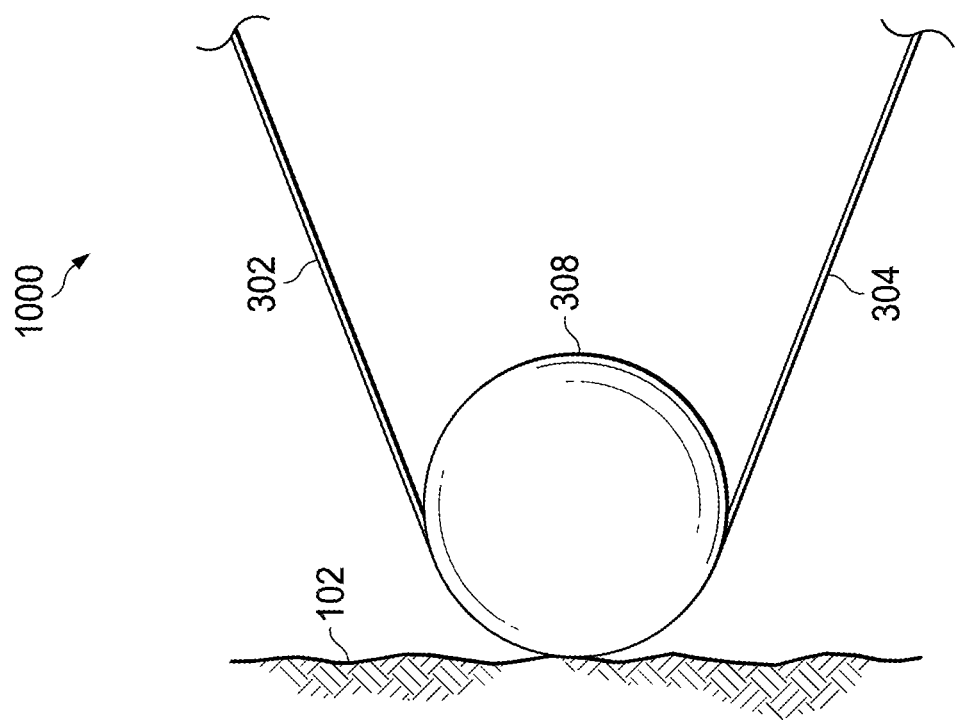
Figure 10B:
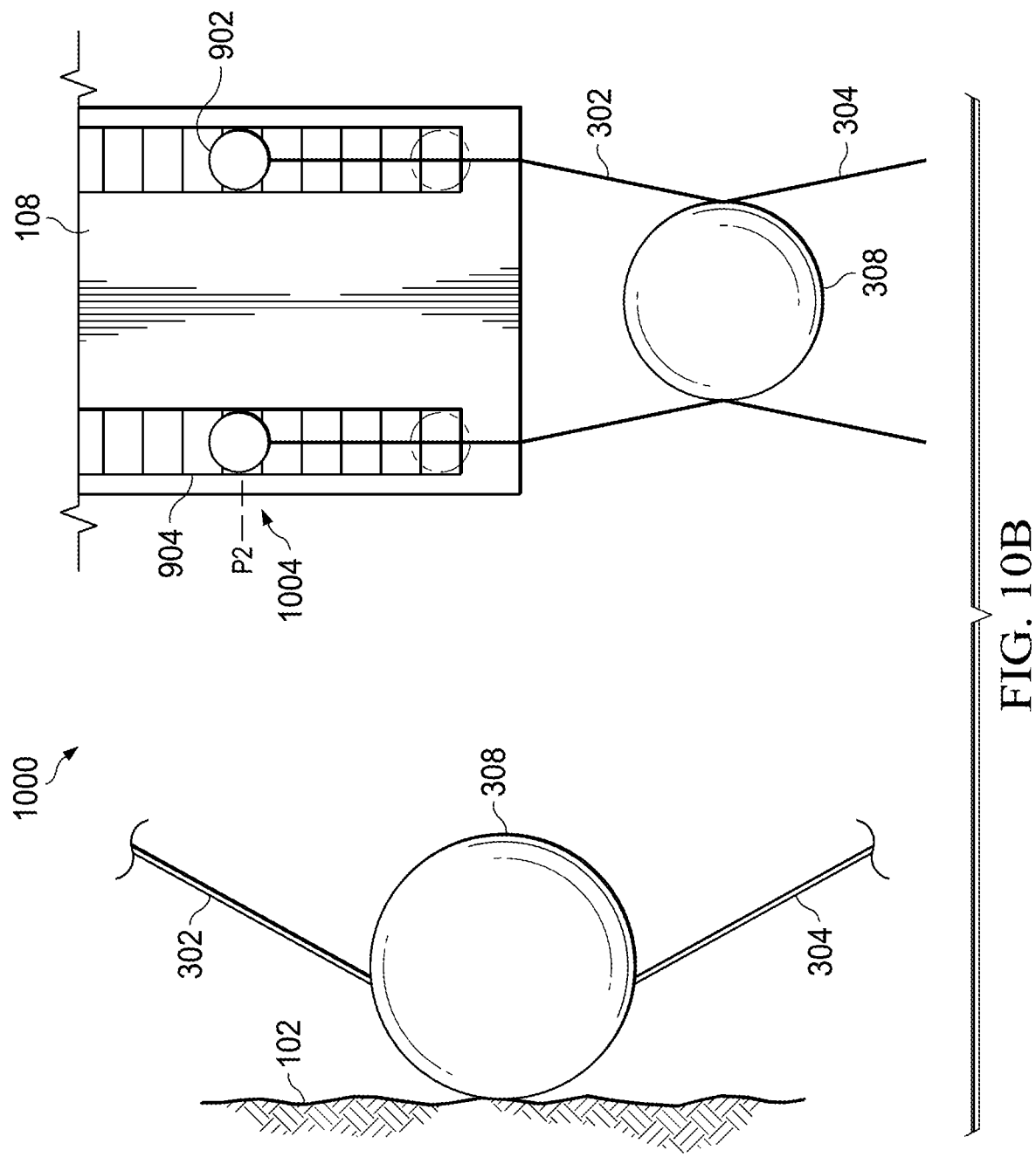

FIGS. 10A and 10B are schematic views of a portion of a caliper sensor assembly 1000 with tracking balls 902 disposed in segmented tracks 904 in the sensor module 108. Inward movement of the balls 308 (e.g., from the position shown in FIG. 10A to the position shown in FIG. 10B) moves the tracking balls 902 uphole along the tracks 904. Two tracking balls 902 are connected to each ball 308 by a wire of the mesh 306. In some caliper sensor assembly, moving tracks and springs may be implemented to allow the balls to move inwards and outwards (as explained with reference to FIGS. 4A-4F).

Figure 11A:
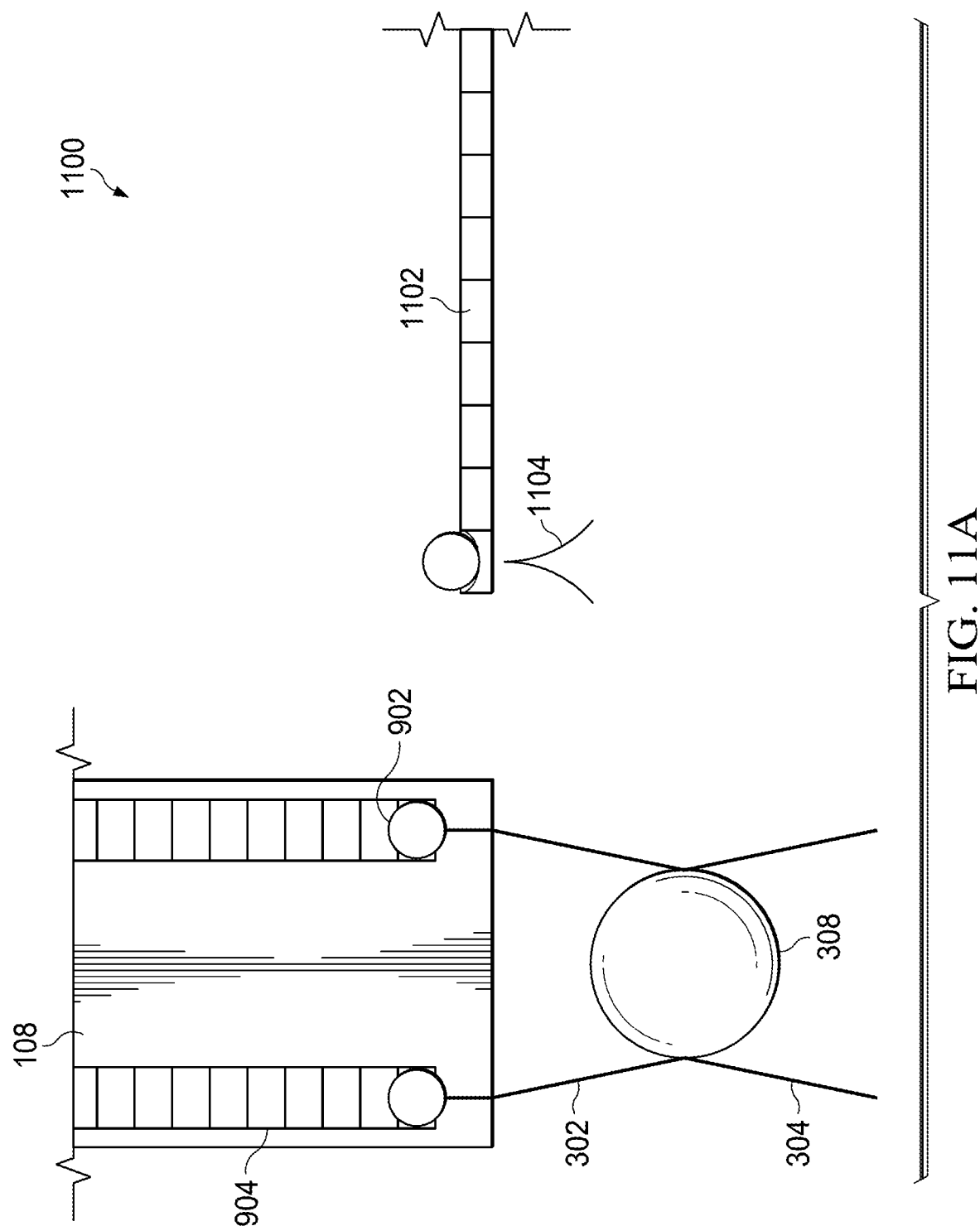
FIGS. 11A and 11B are schematic views of a portion of a caliper sensor assembly in which the segmented tracks have piezoelectric properties.
Figure 11B:
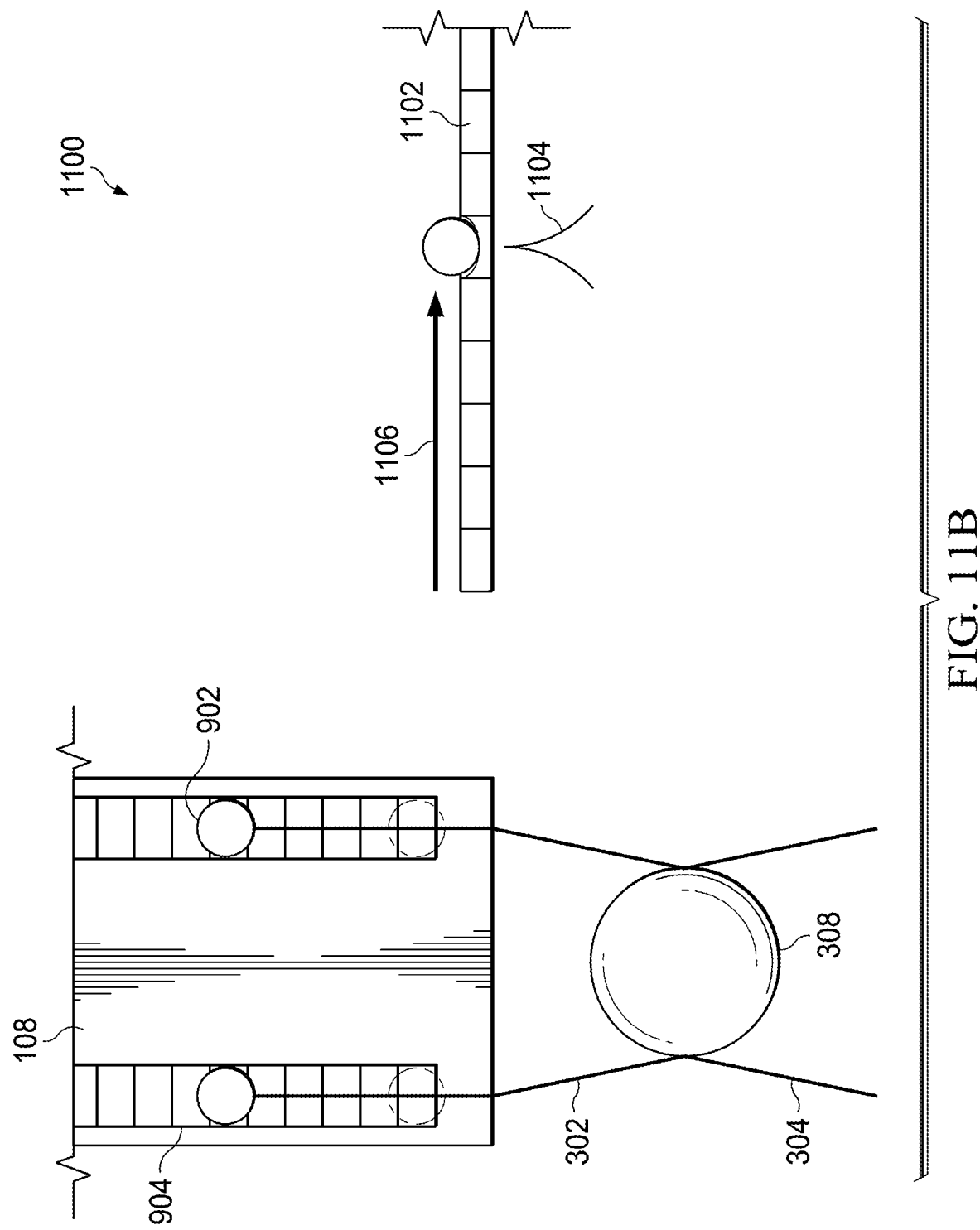

FIGS. 11A and 11B are schematic views of a portion of a caliper sensor assembly 1100 in which the segmented tracks 904 have piezoelectric properties. The tracks 904 include piezoelectric materials 1102 (e.g., quartz, langasite, lithium niobate, or titanium oxide). The piezoelectric segments 1102 are stressed and deformed when the tracking balls 902 move over and along their surfaces. The mechanical stresses and deformation experienced by the piezoelectric elements 1102 generates electric charges resulting in electrical pulses 1104. The movement of the tracking balls 902 (e.g., from the position shown in FIG. 11A to the position shown in FIG. 11B) due to the change in the wellbore diameter 208 results in different piezoelectric segments 1102 being stressed and released. The change in the pattern of the electrical pulse 1104 is correlated into changes in the wellbore diameter 208.

Figure 12:
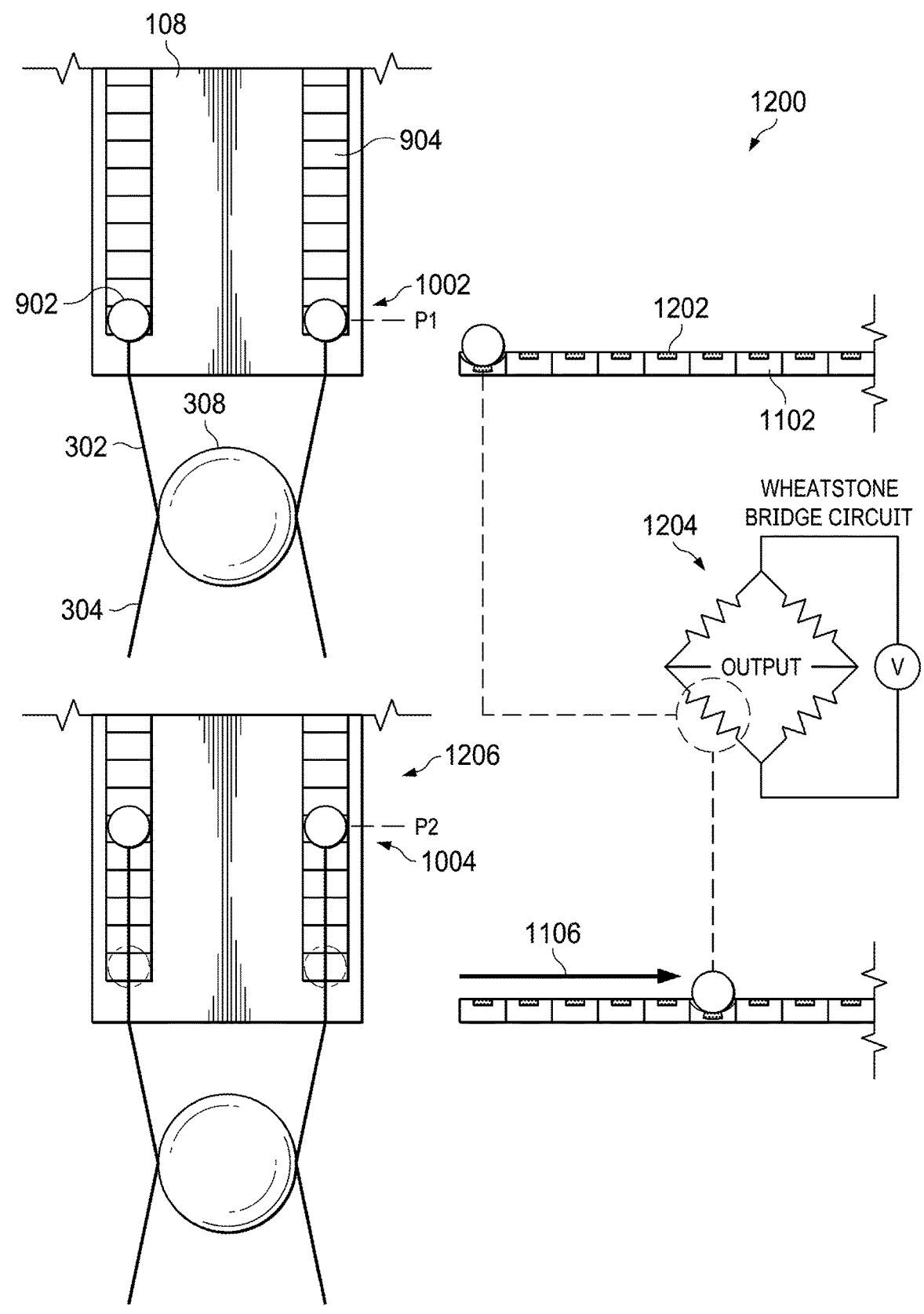
FIG. 12 is a schematic view of a portion of a caliper sensor assembly in which the segmented tracks include embedded piezoresistive elements.

FIG. 12 is a schematic view of a caliper sensor assembly 1200 in which the tracks 904 have embedded piezoresistive elements 1202. The piezoresistive elements 1202 are disposed inside the tracks 904 to form mechanical stress-sensing members. The change in the electrical resistivity of a piezoresistive element 1202 due to an applied strain is known as the piezoresistive effect. Standard wire type strain gauges are bonded to force-sensing members of dissimilar material, which results in thermoelastic strain and complex fabrication processes. In contrast to the piezoelectric effect, the piezoresistive effect results in only a change in electrical resistance rather than in the electrical voltage. Therefore, the piezoresistive elements 1202 are connected with a Wheatstone bridge 1204 and there is a constant input voltage to the bridge. The Wheatstone bridge 1204 is a circuit with three fixed resistors and one varying resistor (i.e., the piezoresistive element 1202) and is able to detect the small changes in resistance accurately. The voltage output of the bridge circuit 1204 is proportional to the change in the resistance, which in turn is related to the strain applied by the tracking balls 902 rolling over the tracks 904 as they travel (e.g., from the position shown in FIG. 12A to the position shown in FIG. 12B) due to the change in the wellbore diameter 208. The piezoresistive elements 1202 can be formed from silicon and germanium or their alloys, diamond, graphene, carbon nanotubes, samarium monosulfide, and Heusler compounds.

Figure 13:
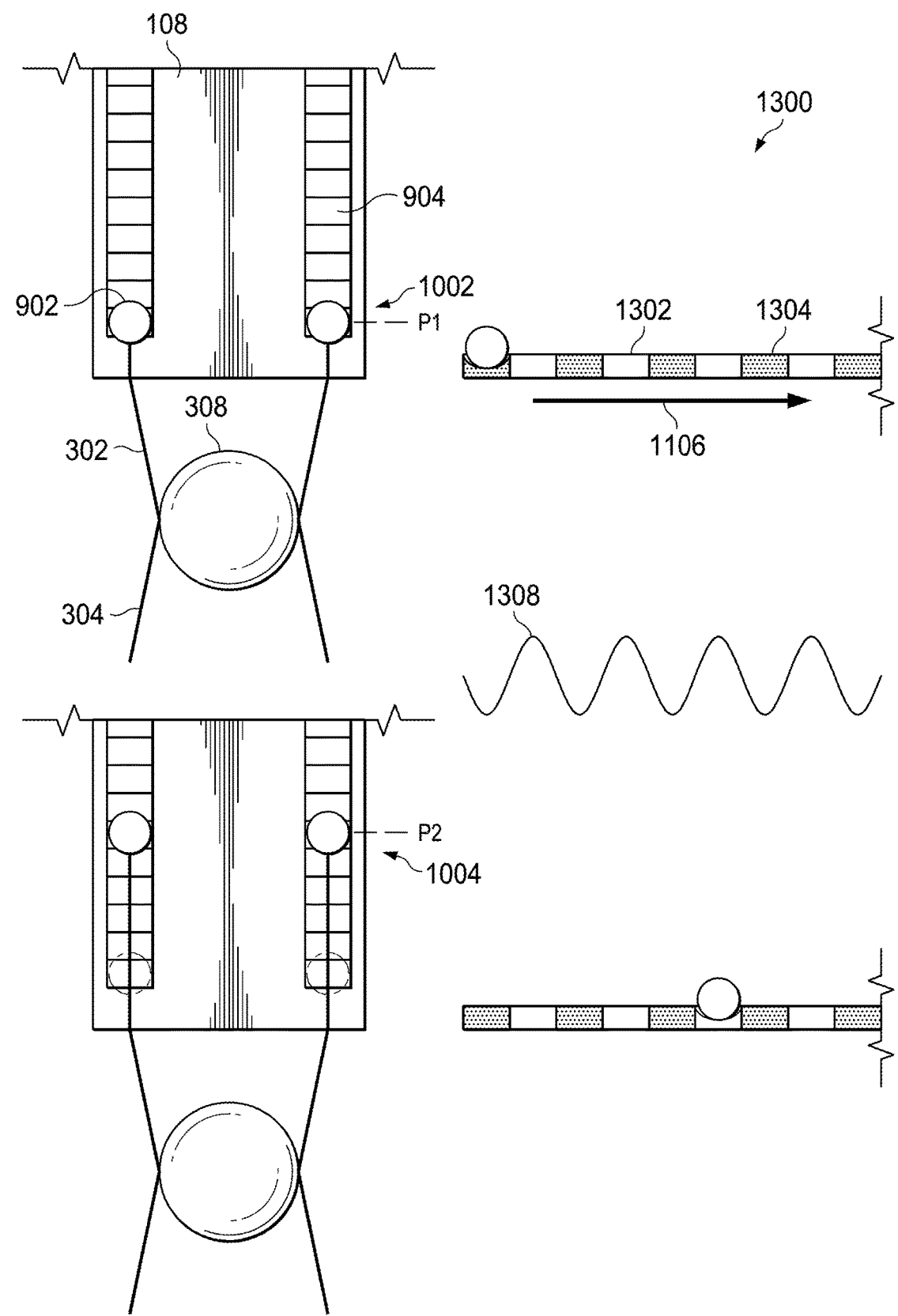
FIG. 13 is a schematic view of a portion of a caliper sensor assembly with segmented tracks have alternating material properties.

FIG. 13 is a schematic view of a portion of a caliper sensor assembly 1300 with segmented tracks 904 have alternating material properties. The caliper sensor assembly 1300 uses a similar approach to the caliper sensor assembly 700 described with respect to FIGS. 7A and 7B. The tracks 904 are coated with periodic arrays of a first material 1302 and a second material 1304. The tracking balls 902 are also coated with either the first material 1302 or the second material 1304. The movement 1106 of the tracking balls 902 along the tracks 904 results in the contact and separation between materials 1302, 1304. Other approaches are possible. For example, the tracks 904 of some caliper sensor assemblies are made of the first material 702 and the second material 704 rather than having the first material 702 and the second material 704 coated on the walls. In another example, some caliper sensor assemblies have arrays with more than two different materials.

As previously discussed, this approach is most effective when the first material 1302 and the second material 1304 have polarities that are very different from each other (e.g., opposite polarities). Examples of appropriate materials include polyamide, polytetrafluoroethylene (PTFE), polyethylene terephthalate (PET), polydimethylacrylamide (PDMA), polydimethylsiloxane (PDMS), polyimide, carbon nanotubes, copper, silver, aluminum, lead, elastomer, teflon, kapton, nylon, and polyester. As the diameter 208 of the wellbore 102 changes, the motion of the tracking balls 902 (e.g., in direction 1106) along the alternating material segments 1302, 1304 generates a waveform 1308. The waveform can be correlated with changes in the wellbore diameter 208.

Figure 14:
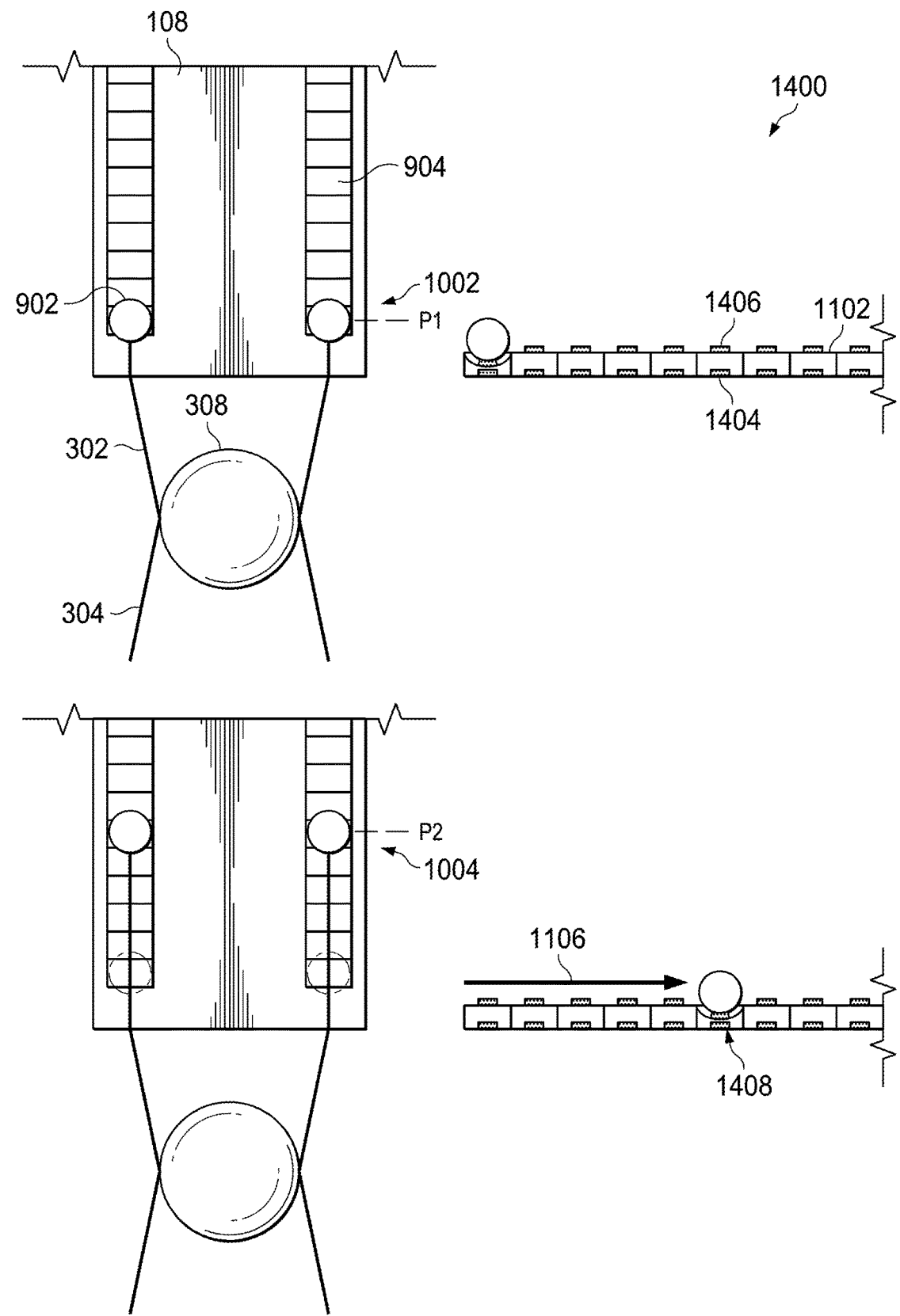
FIG. 14 is a schematic view of a portion of a caliper sensor assembly with dielectric segmented tracks that include upper and lower electrodes.

FIG. 14 is a schematic view of a portion of a caliper sensor assembly 1400 with tracks 904 that include upper electrodes 1406 and lower electrodes 1404. A dielectric layer separates the upper electrodes 1406 from the lower electrodes 1404 to form a capacitor. When the tracking balls 902 move along the tracks 904, the tracking balls 902 exert compressive force on the top electrodes 1406 and changing the distance between the top 1406 and the bottom 1404 electrodes. This results in change of the electric field and the capacitance of the capacitor. When the capacitor is connected to an RLC (resistor, inductor, capacitor) circuit, the change in capacitance results in the shift of the resonance frequency of the circuit. The changes in the resonance frequency of the circuit can be correlated with changes in the wellbore diameter 208.

Figure 15A:
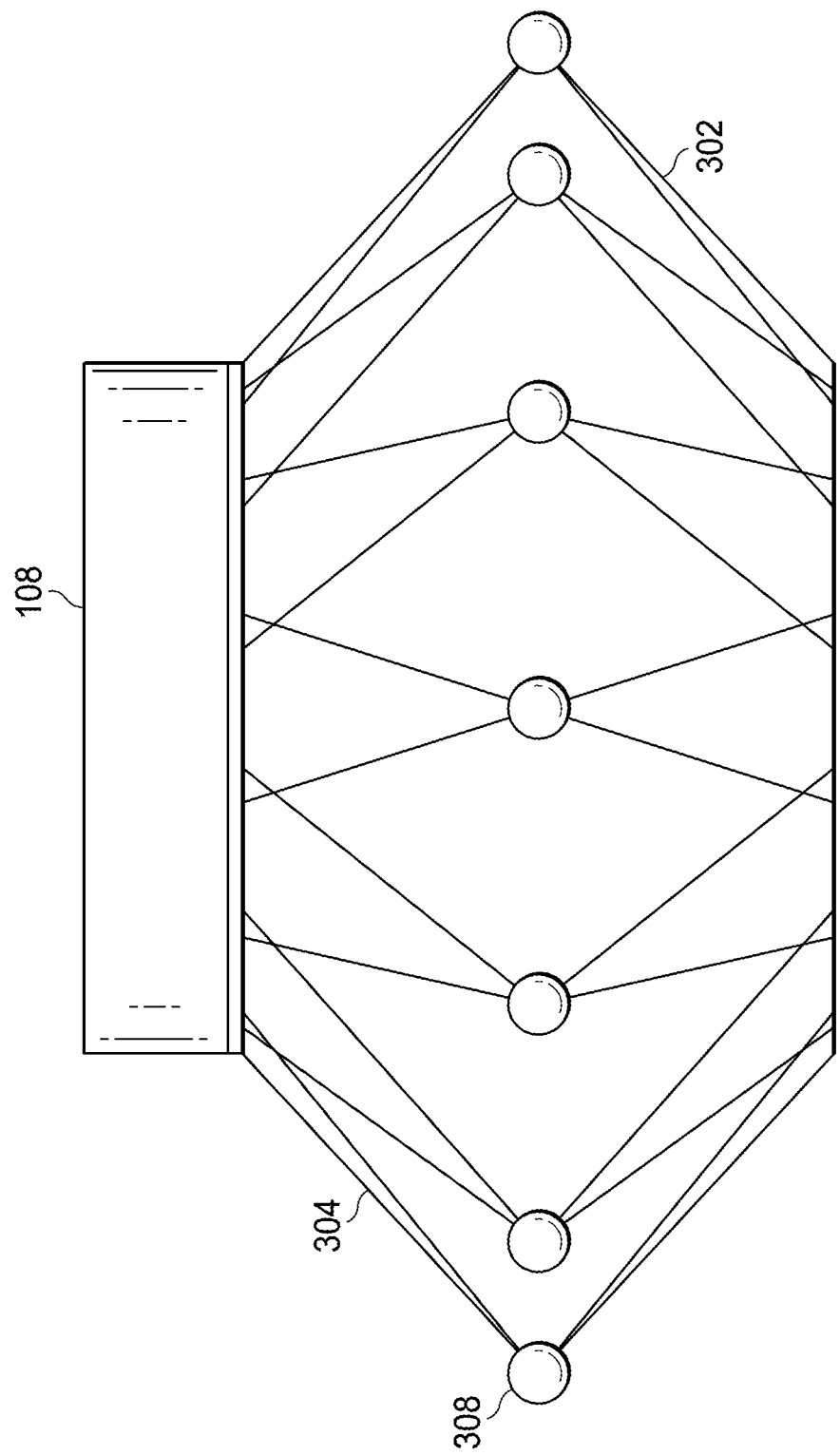
FIGS. 15A and 15B are schematic views of a portion of a caliper sensor assembly with piezoelectric segmented tracks incorporated in electronic circuitry forming micro-electromechanical systems.
Figure 15B:
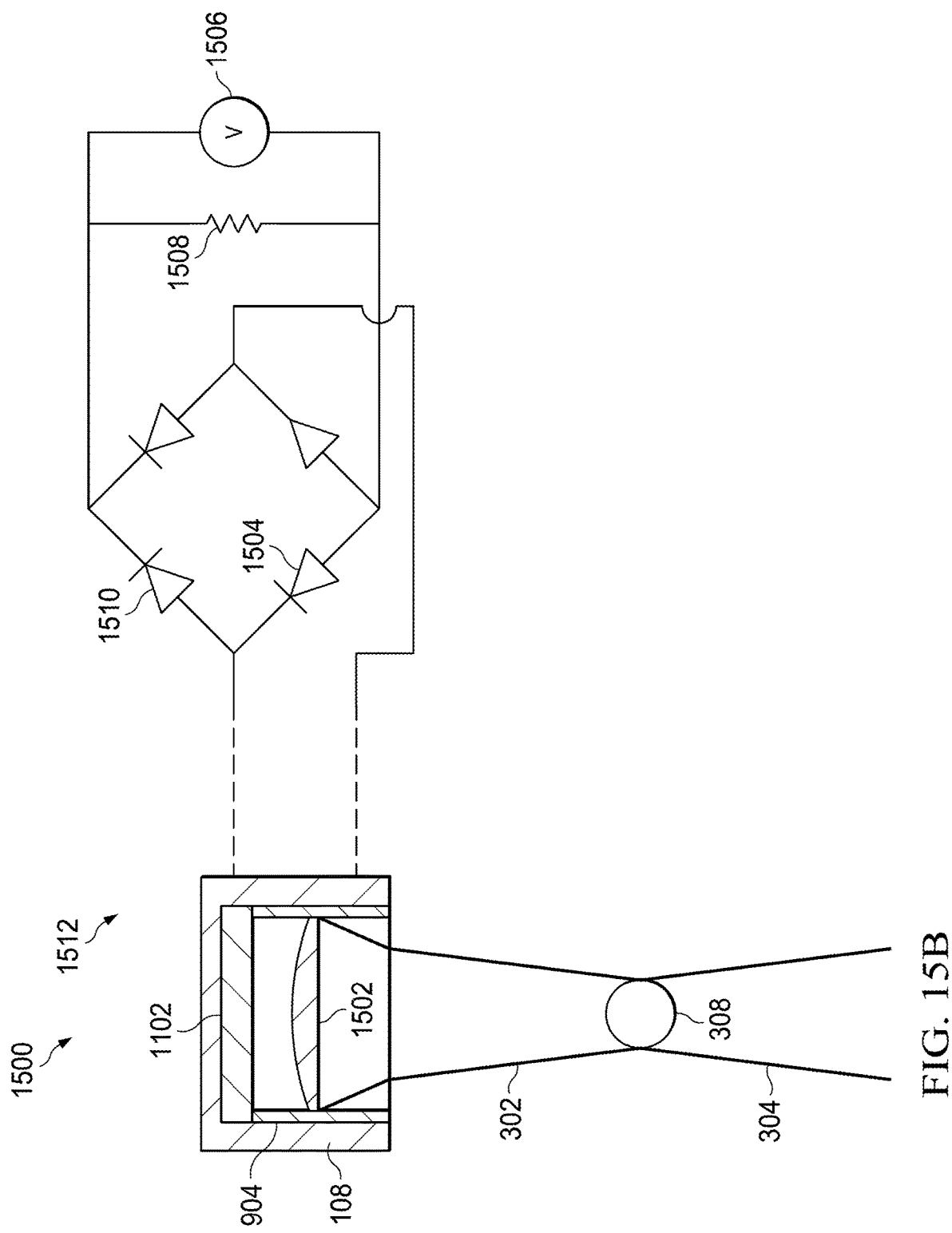

FIGS. 15A and 15B are schematic views of a caliper sensor assembly 1500 with segmented tracks 904 fabricated on electronic circuitry forming MEMS 1512. The sensor module 108 of the caliper sensor assembly 1500 is shorter than the sensor module 108 of the caliper sensor assemblies described with respect to FIGS. 9A-14. The uppermost part 316 of the uphole portion of the wire mesh 306 is connected to a semi-elliptical head 1502, which can move up and down the track 904. The head 1502 can have other shapes that provide good contact between the head 1502 and the end segment 1102.

The illustrated caliper sensor assembly 1500 can be implemented with the end segment 1102 being a piezoelectric segment. The piezoelectric segment 1102 generates electric charges when a mechanical force is applied on it and this electric signal is changed from an analog signal to a digital signal by a bridge rectifier circuit employing diodes 1504. A voltmeter 1506 measures the corresponding voltage across a resistor 1508. There is typically a light contact between the head 1502 and the piezoelectric segment 1102 when there is a contact between the ball 308 and the wellbore wall 208. The mechanical stresses experienced by the piezoelectric segment 1102 due to this contact result in the generation of electric charges. As the diameter 208 of the wellbore 102 changes, head 1502 moves further up the track 904, towards the piezoelectric segment 1102 resulting in the generation of more electric charges. These changes in the electric charges are correlated with changes in the wellbore diameter 208.

The illustrated caliper sensor assembly 1500 can be implemented with the end segment 1102 being a piezoresistive segment. The piezoresistive element 1202 can be fabricated on electronic circuitry as micro-electromechanical systems (MEMS) 1512. The head 1502 can move up and down the track 904 and the piezoresistive segment 1202 changes electrical resistivity due to the applied strain. In this implementation, the bridge rectifier circuit is replaced by a Wheatstone bridge 1204 that transforms changes in electrical resistivity to change in voltage.

Figure 16:
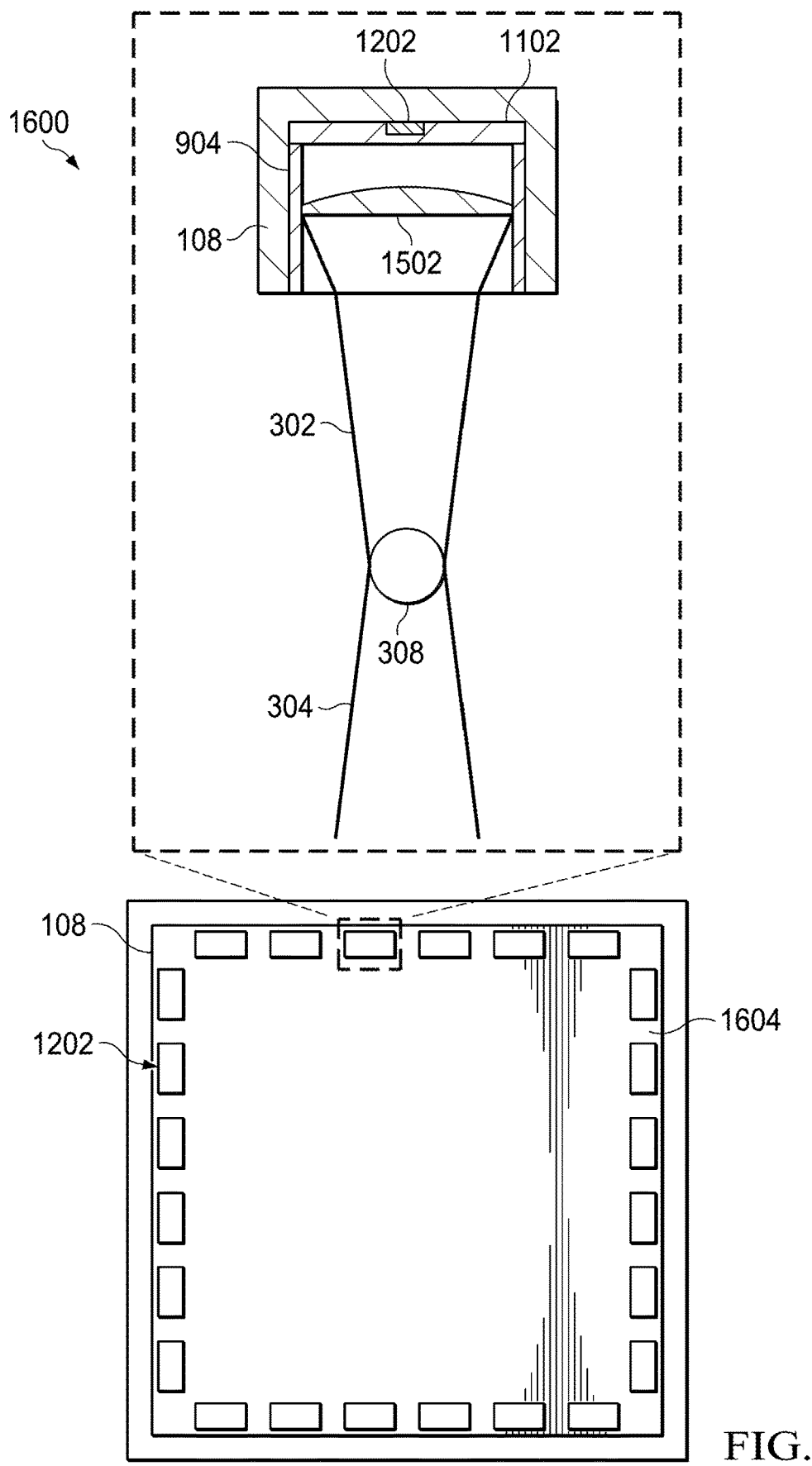
FIG. 16 is a schematic view of a portion of a caliper sensor assembly with segmented tracks.

FIG. 16 shows a caliper sensor assembly 1600 in which piezoresistive elements 1202 linked to all the balls 308 are placed on a substrate serving as a diaphragm 1604. The piezoresistive segments 1202 are preferably at the region of maximum stress on the diaphragm 1604. The application of pressure underneath the head 1502 causes a deflection of the diaphragm 1604 and this causes a change in resistance and in voltage output. A light contact is generated between the head 1502 and the piezoresistive segment 1202 when there is a contact between the ball 308 and the wellbore wall 102. This contact results in the head 1502 applying a mechanical stress on the piezoresistive segment 1202. This stress causes a change in the electrical resistance of the piezoresistive segment 1202 that generates a change in the output voltage of the Wheatstone bridge 1204. As the diameter 208 of the wellbore 102 changes, the ball 308 makes further contact with the wellbore wall 102 resulting in further changes in the output voltage. These changes in the output voltage are correlated with changes in the wellbore diameter 208.

Figure 17:
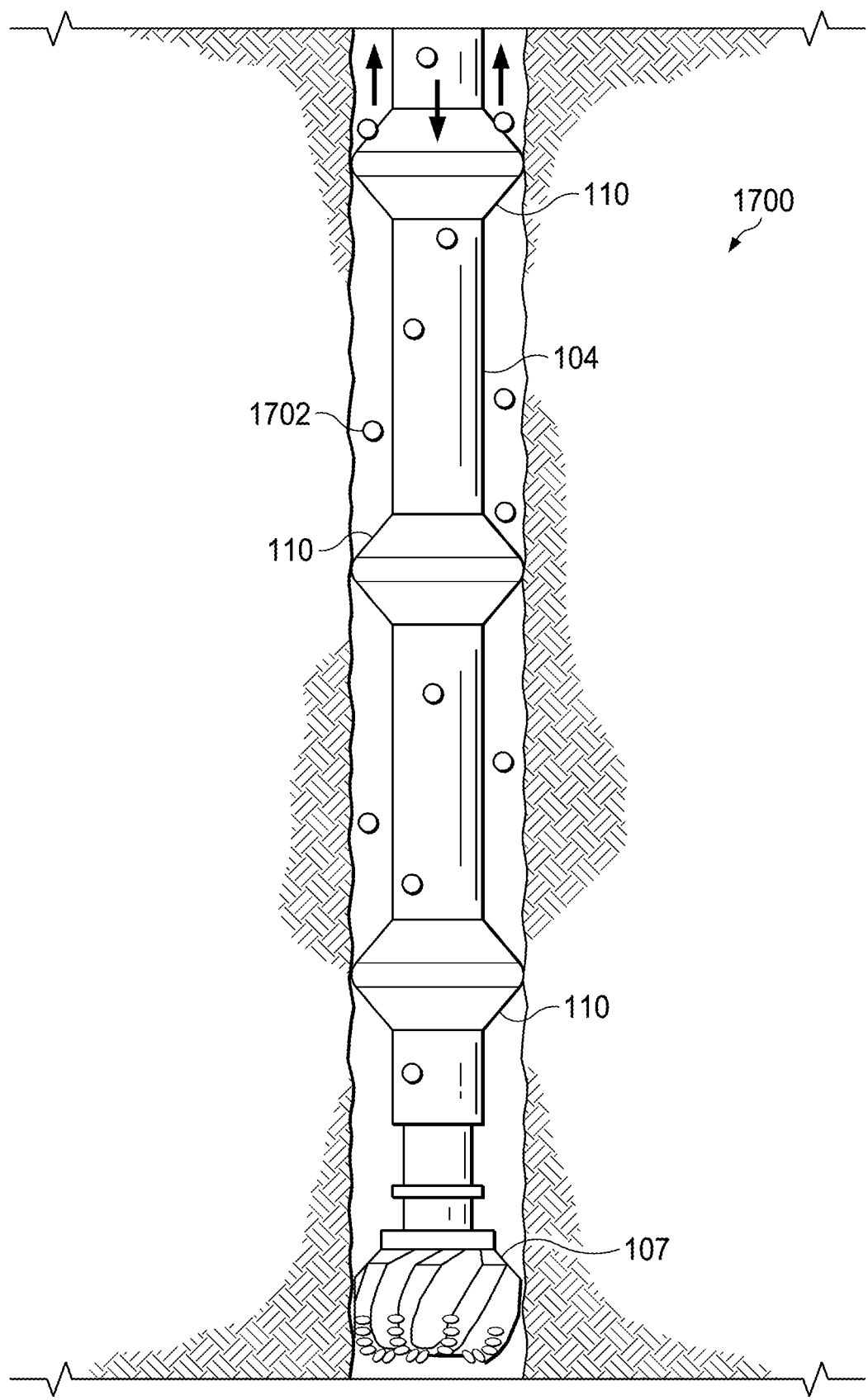
FIG. 17 is a view of a portion of a schematic showing the downhole caliper tool with in use with memory capsules in the drilling fluid.

FIG. 17 is a view of a schematic 1700 showing a drill string with multiple downhole caliper tools 111. The caliper tools 110 can be placed along the drillstring system 100 at chosen intervals to obtain real-time distributed data. Data obtained by one caliper tool 110 might not stay constant and may change over time due to drilling and other operations performed inside a wellbore 102. For example, data acquired by a caliper tool 110 at certain depths along a wellbore 102 may change over time. It is not possible to obtain real-time information of these parameters at varying depths unless the caliper tool 110 is run multiple times, which is very costly and not feasible. Data can be transmitted along the drillstring wirelessly, moving along the data units as in a relay from the bottom to the surface and from the surface to the bottom. The caliper tool 110 can be placed outside a drillstring at a distance chosen based on the maximum distance data can electromagnetically transmit from one caliper tool to another. This method of transmitting data along the drillstring is independent of drilling fluid flow and is faster than mud pulse telemetry. Caliper tools 110 can also be used as data storage units along a drillstring assembly 100. The data storage units collect wellbore diameter 208 information and store it in the system memory.

Some implementations of this approach use memory-gathering capsules 1702 to transfer data to the surface. The memory-gathering capsules 1702 are injected into the well 102 from the surface. The data stored in the storage units can be transferred to the capsules 1702 as they flow past the units. The capsules 1702 circulate with the drilling fluid through the drillstring assembly 100, out the drill bit 107, up the wellbore 102, and are recovered at the surface 116 where the data can be downloaded. The memory of the capsules 1702 can be erased before they go inside the well 102 again so that there is sufficient space to store the data for the next circulating cycle. This approach uses wireless data transfer methods including low-power Wi-Fi, Bluetooth, Bluetooth low energy, ZigBee and the corresponding antennas required for such technologies. These technologies can be on-chip or detachable. Low power wireless technologies (e.g., Bluetooth) can connect up to seven devices within a range of 33 feet with a data transfer rate of about 1-3 Mbits/s.

Figure 18:
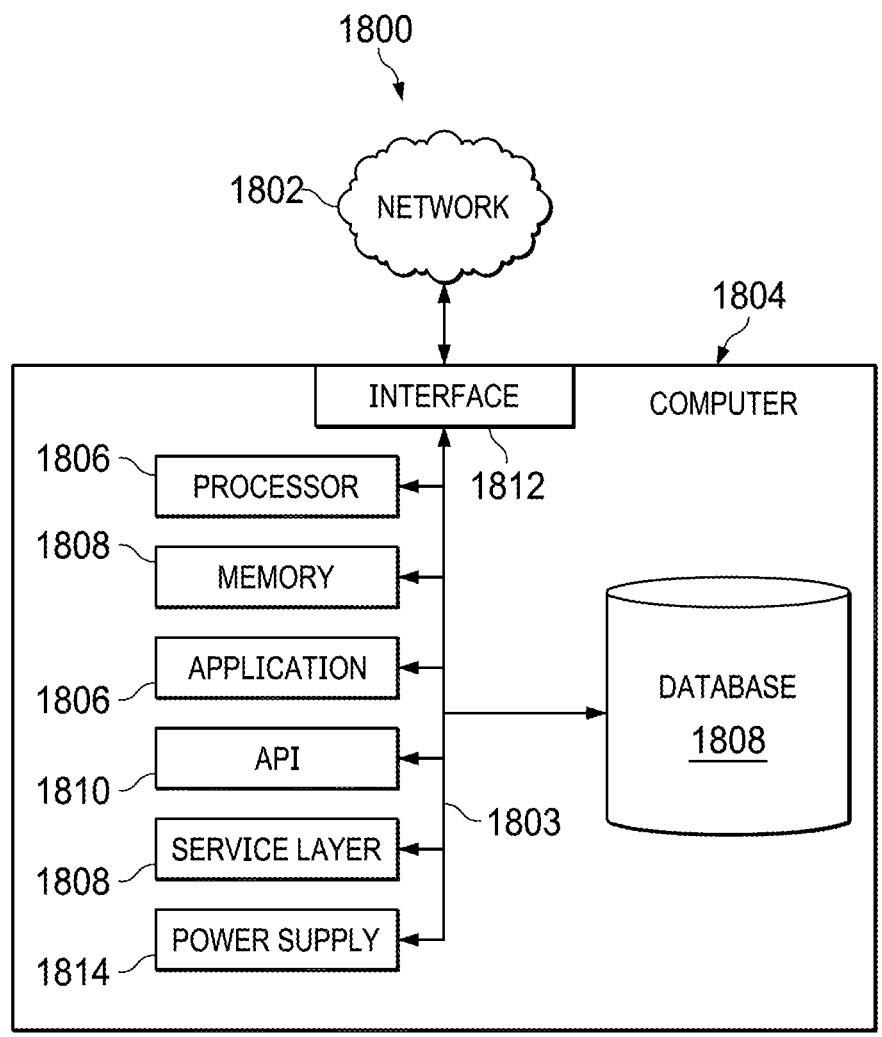
FIG. 18 is a block diagram of an example computer system.

FIG. 18 is a block diagram of an example computer system 1800 used to provide computational functionalities associated with described algorithms, methods, functions, processes, flows, and procedures described in the present disclosure, according to some implementations of the present disclosure.

The illustrated computer 1804 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1804 can include input devices such as keypads, keyboards, and touch screens that can accept user information. Also, the computer 1804 can include output devices that can convey information associated with the operation of the computer 1804. The information can include digital data, visual data, audio information, or a combination of information. The information can be presented in a graphical user interface (UI) (or GUI).

The computer 1804 can serve in a role as a client, a network component, a server, a database, a persistency, or components of a computer system for performing the subject matter described in the present disclosure. The illustrated computer 1804 is communicably coupled with a network 1802. In some implementations, one or more components of the computer 1804 can be configured to operate within different environments, including cloud-computing-based environments, local environments, global environments, and combinations of environments.

At a high level, the computer 1804 is an electronic computing device operable to receive, transmit, process, store, and manage data and information associated with the described subject matter. According to some implementations, the computer 1804 can also include, or be communicably coupled with, an application server, an email server, a web server, a caching server, a streaming data server, or a combination of servers.

The computer 1804 can receive requests over network 1802 from a client application (for example, executing on another computer 1804). The computer 1804 can respond to the received requests by processing the received requests using software applications. Requests can also be sent to the computer 1804 from internal users (for example, from a command console), external (or third) parties, automated applications, entities, individuals, systems, and computers.

Each of the components of the computer 1804 can communicate using a system bus 1812. In some implementations, any or all of the components of the computer 1804, including hardware or software components, can interface with each other or the interface (or a combination of both), over the system bus 1812. Interfaces can use an application programming interface (API) 1810, a service layer 1808, or a combination of the API 1810 and service layer 1808. The 1810 can include specifications for routines, data structures, and object classes. The API 1810 can be either computer-language independent or dependent. The API 1810 can refer to a complete interface, a single function, or a set of APIs.

The service layer 1808 can provide software services to the computer 1804 and other components (whether illustrated or not) that are communicably coupled to the computer 1804. The functionality of the computer 1804 can be accessible for all service consumers using this service layer 1808. Software services, such as those provided by the service layer 1808, can provide reusable, defined functionalities through a defined interface. For example, the interface can be software written in JAVA, C++, or a language providing data in extensible markup language (XML) format. While illustrated as an integrated component of the computer 1804, in alternative implementations, the API 1810 or the service layer 1808 can be stand-alone components in relation to other components of the computer 1804 and other components communicably coupled to the computer 1804. Moreover, any or all parts of the API 1810 or the service layer 1808 can be implemented as child or sub-modules of another software module, enterprise application, or hardware module without departing from the scope of the present disclosure.

The computer 1804 includes an interface 1810. Although illustrated as a single interface 1810 in FIG. 18, two or more interfaces 1810 can be used according to particular needs, desires, or particular implementations of the computer 1804 and the described functionality. The interface 1810 can be used by the computer 1804 for communicating with other systems that are connected to the network 1802 (whether illustrated or not) in a distributed environment. Generally, the interface 1810 can include, or be implemented using, logic encoded in software or hardware (or a combination of software and hardware) operable to communicate with the network 1802. More specifically, the interface 1810 can include software supporting one or more communication protocols associated with communications. As such, the network 1802 or the interface's hardware can be operable to communicate physical signals within and outside of the illustrated computer 1804.

The computer 1804 includes a processor 1806. Although illustrated as a single processor 1806 in FIG. 18, two or more processors 1806 can be used according to particular needs, desires, or particular implementations of the computer 1804 and the described functionality. Generally, the processor 1806 can execute instructions and can manipulate data to perform the operations of the computer 1804, including operations using algorithms, methods, functions, processes, flows, and procedures as described in the present disclosure.

The computer 1804 also includes a database 1808 that can hold data for the computer 1804 and other components connected to the network 1802 (whether illustrated or not). For example, database 1808 can be an in-memory, conventional, or a database storing data consistent with the present disclosure. In some implementations, database 1808 can be a combination of two or more different database types (for example, hybrid in-memory and conventional databases) according to particular needs, desires, or particular implementations of the computer 1804 and the described functionality. Although illustrated as a single database 1808 in FIG. 18, two or more databases (of the same, different, or combination of types) can be used according to particular needs, desires, or particular implementations of the computer 1804 and the described functionality. While database 1808 is illustrated as an internal component of the computer

1804, in alternative implementations, database 1808 can be external to the computer 1804.

The computer 1804 also includes a memory 1808 that can hold data for the computer 1804 or a combination of components connected to the network 1802 (whether illustrated or not). Memory 1808 can store any data consistent with the present disclosure. In some implementations, memory 1808 can be a combination of two or more different types of memory (for example, a combination of semiconductor and magnetic storage) according to particular needs, desires, or particular implementations of the computer 1804 and the described functionality. Although illustrated as a single memory 1808 in FIG. 18, two or more memories 1808 (of the same, different, or combination of types) can be used according to particular needs, desires, or particular implementations of the computer 1804 and the described functionality. While memory 1808 is illustrated as an internal component of the computer 1804, in alternative implementations, memory 1808 can be external to the computer 1804.

The application 1806 can be an algorithmic software engine providing functionality according to particular needs, desires, or particular implementations of the computer 1804 and the described functionality. For example, application 1806 can serve as one or more components, modules, or applications. Further, although illustrated as a single application 1806, the application 1806 can be implemented as multiple applications 1806 on the computer 1804. In addition, although illustrated as internal to the computer 1804, in alternative implementations, the application 1806 can be external to the computer 1804.

The computer 1804 can also include a power supply 1814. The power supply 1814 can include a rechargeable or non-rechargeable battery that can be configured to be either user- or non-user-replaceable. In some implementations, the power supply 1814 can include power-conversion and management circuits, including recharging, standby, and power management functionalities. In some implementations, the power-supply 1814 can include a power plug to allow the computer 1804 to be plugged into a wall socket or a power source to, for example, power the computer 1804 or recharge a rechargeable battery.

There can be any number of computers 1804 associated with, or external to, a computer system containing computer 1804, with each computer 1804 communicating over network 1802. Further, the terms "client," "user," and other appropriate terminology can be used interchangeably, as appropriate, without departing from the scope of the present disclosure. Moreover, the present disclosure contemplates that many users can use one computer 1804 and one user can use multiple computers 1804.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A downhole caliper tool for deployment on a drill string to measure wellbore diameter while drilling, the downhole caliper tool comprising:
   a downhole collar;
   an uphole collar having a running position and a sensing position wherein the uphole collar is farther from the downhole collar in the running position than in the sensing position; and
   a caliper sensor assembly comprising:
      a sensor module defining a plurality of tracks extending parallel to an axis of the caliper tool, the sensor module positioned towards an uphole end of the caliper tool relative to the uphole collar; and
      a caliper disposed between the downhole collar and the uphole collar, the caliper comprising:
         a flexible mesh extending from the downhole collar to the uphole collar, wherein movement of the uphole collar from the running position to the sensing position axially compresses and radially expands the flexible mesh;
         wherein the annular sensor module is operable to measure a size and shape of an outermost portion of the flexible mesh relative to the axis of the caliper tool.

2. The downhole caliper tool of claim 1, wherein the caliper further comprises a plurality of balls attached to the flexible mesh halfway between the uphole collar and the downhole collar.

3. The downhole caliper tool of claim 2, the sensor module comprises a plurality of tracking balls with each tracking ball associated with one of the plurality of tracks extending parallel to the axis of the caliper tool.

4. The downhole caliper tool of claim 3, wherein two of the tracking balls are connected by wire to each of the plurality of balls attached to the flexible mesh halfway between the uphole collar and the downhole collar.

5. The downhole caliper tool of claim 3, wherein each of the plurality of tracking balls are positioned downhole or uphole along the associated track from the plurality of tracks.

6. The downhole caliper tool of claim 1, wherein each of the tracks comprises piezoelectric material.

7. The downhole caliper tool of claim 1, wherein each of the tracks comprises a piezoresistive element.

8. The downhole caliper tool of claim 1, wherein each of the tracks comprises a periodic array of two or more alternating materials.

9. The downhole caliper tool of claim 1, wherein each of the tracks functions as a capacitor with upper electrodes separated from lower electrodes by a dielectric layer.

10. The downhole caliper tool of claim 1, wherein the flexible mesh comprises a wire mesh.

11. The downhole caliper tool of claim 1, wherein the uphole collar has a running position and a sensing position and the uphole collar is farther from the downhole collar in the running position than in the sensing position.

12. The downhole caliper tool of claim 11, wherein movement of the uphole collar from the running position to the sensing position axially compresses and radially expands the caliper sensing assembly.

13. A downhole caliper tool comprising:
    a downhole collar;
    an uphole collar having a running position and a sensing position wherein the uphole collar is farther from the downhole collar in the running position than in the sensing position; and
    a caliper sensor assembly comprising:
       a sensor module; and
       a flexible mesh extending from the downhole collar to the uphole collar, wherein movement of the uphole collar from the running position to the sensing position axially compresses and radially expands the flexible mesh;
       wherein the annular sensor module is operable to measure a size and shape of an outermost portion of the flexible mesh relative to the axis of the caliper tool.

14. The downhole caliper tool of claim 13, wherein movement of the uphole collar from the running position to the sensing position axially compresses and radially expands the caliper sensing assembly.

15. The downhole caliper tool of claim 13, wherein the caliper further comprises a plurality of balls attached to the flexible mesh halfway between the uphole collar and the downhole collar.

16. The downhole caliper tool of claim 15, the sensor module comprises a plurality of tracking balls with each tracking ball associated with one of the plurality of tracks extending parallel to the axis of the caliper tool.

17. The downhole caliper tool of claim 16, wherein two of the tracking balls are connected by wire to each of the plurality of balls attached to the flexible mesh halfway between the uphole collar and the downhole collar.

18. The downhole caliper tool of claim 13, wherein the flexible mesh comprises a wire mesh.

\* \* \* \* \*